United States Patent
Kamura et al.

(10) Patent No.: US 11,884,868 B2
(45) Date of Patent: Jan. 30, 2024

(54) LATENT HEAT STORAGE MATERIAL, AND COLD STORAGE TOOL, LOGISTIC PACKAGING CONTAINER, TRANSPORTATION METHOD, HUMAN BODY REFRIGERATION TOOL AND COLD STORAGE TOOL FOR BEVERAGES EACH USING SAME

(71) Applicant: SHARP KABUSHIKI KAISHA, Sakai (JP)

(72) Inventors: Masakazu Kamura, Sakai (JP); Hwisim Hwang, Sakai (JP); Kyohei Sezukuri, Sakai (JP); Yuka Utsumi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 859 days.

(21) Appl. No.: 16/964,843

(22) PCT Filed: Feb. 1, 2019

(86) PCT No.: PCT/JP2019/003678
§ 371 (c)(1),
(2) Date: Jul. 24, 2020

(87) PCT Pub. No.: WO2019/151492
PCT Pub. Date: Aug. 8, 2019

(65) Prior Publication Data
US 2021/0062058 A1   Mar. 4, 2021

(30) Foreign Application Priority Data
Feb. 2, 2018 (JP) ................................ 2018-017639

(51) Int. Cl.
*C09K 5/06* (2006.01)
*F28D 20/02* (2006.01)
(Continued)

(52) U.S. Cl.
CPC .............. *C09K 5/063* (2013.01); *F28D 20/02* (2013.01); *F25D 3/00* (2013.01); *F25D 2303/085* (2013.01); *F28D 2020/0008* (2013.01)

(58) Field of Classification Search
CPC ........... C09K 5/063; C09K 5/06; F28D 20/02; F28D 2020/0008; F28D 2020/0021;
(Continued)

(56) References Cited

U.S. PATENT DOCUMENTS
2010/0133464 A1   6/2010 Tomura

FOREIGN PATENT DOCUMENTS
JP     S57-35224 A      2/1982
JP     2007-186667 A    7/2007
(Continued)

OTHER PUBLICATIONS
English Translation of JP2008214482A (Year: 2008).*
(Continued)

*Primary Examiner* — Andrew J. Oyer
(74) *Attorney, Agent, or Firm* — ScienBiziP, P.C.

(57) ABSTRACT

Provided are a latent heat storage material having a melting point within a prescribed temperature range; a latent heat. The latent heat storage material includes a compound (A) represented by a formula (A), an inorganic salt (B) represented by a formula (B) and composed of a cation of an alkali metal and an anion of the same element as the anion of the quaternary alkyl salt, and water. The compound (A) is a material that forms a clathrate hydrate together with the water, the composition ratio of the compound (A) and water is a composition ratio that gives a congruent melting point of the clathrate hydrate, and the molar ratio of the inorganic salt (B) to the compound (A) is 0.1 or more and 10 or less.

20 Claims, 20 Drawing Sheets

(51) Int. Cl.
  *F25D 3/00*    (2006.01)
  *F28D 20/00*   (2006.01)
(58) Field of Classification Search
  CPC ........ F25D 3/00; F25D 2303/085; F25D 3/08;
        F25D 2303/082; F25D 2303/0843; F25D
              2303/0845; Y02E 60/14
  See application file for complete search history.

(56) References Cited

FOREIGN PATENT DOCUMENTS

JP    2008214482 A  *  9/2008  ............. C09K 5/063
WO    2015/076095 A1    5/2015

OTHER PUBLICATIONS

L. S. Aladko et al. "Clathrate Hydrates of Tetrabutylammonium and Tetraisoamylammonium Halides", Journal of Structural Chemistry, vol. 43, No. 6, pp. 990-994, 2002.

* cited by examiner

LATENT HEAT STORAGE MATERIAL, AND COLD STORAGE TOOL, LOGISTIC PACKAGING CONTAINER, TRANSPORTATION METHOD, HUMAN BODY REFRIGERATION TOOL AND COLD STORAGE TOOL FOR BEVERAGES EACH USING SAME

TECHNICAL FIELD

The present invention relates to a latent heat storage material, and a cold storage tool, a logistic packaging container, a transportation method, a human body refrigeration tool, and a cold storage tool for beverages each using the latent heat storage material.

This application claims priority from Japanese Patent Application No. 2018-017639, filed Feb. 2, 2018, the disclosure of which is hereby incorporated by reference herein in its entirety.

BACKGROUND ART

The use of clathrate hydrates as heat storage materials has been studied. A heat storage material is required to be capable of performing appropriate cooling down according to, for example, the transportation conditions for objects to be kept cold.

A clathrate hydrate represented by methane hydrate is a compound having a structure in which a molecule (gest molecule) different from water is included in a cage structure of water molecules by hydrogen bonding.

Such a clathrate hydrate is formed when the ratio of guest molecules and water molecules, the temperature, and the pressure are matched to the conditions giving a congruent melting point.

For example, under normal pressure, tetrahydrofuran forms a clathrate hydrate when the molar ratio thereof to water is 19 at 4° C. or less. In addition, it is well known that quaternary ammonium salts also form clathrate hydrates under normal pressure. The formation of a clathrate hydrate is accompanied by heat generation, and the dissociation is accompanied by heat absorption. Accordingly, by using this phenomenon, the clathrate hydrate has been applied as a latent heat storage material (for example, PTLs 1 and 2).

Incidentally, the generation and dissociation of a clathrate hydrate are similar to solidification and melting in a solid-liquid phase change material and are referred to as solidification and melting, respectively. In addition, the temperatures thereof may be referred to as a solidifying point and a melting point, respectively.

In particular, (semi) clathrate hydrates of quaternary alkyl salts such as quaternary ammonium salts and quaternary phosphonium salts are noncombustible and have relatively high latent heat and are therefore useful as latent heat storage materials.

At the same time, when a clathrate hydrate is used as a latent heat storage material, the solidifying point or the melting point is required to be controlled within the temperature range of an object to be kept warm or cold. In general, the melting point of a clathrate hydrate is uniquely determined depending on the guest molecule. NPL 1 shows that when the chemical structure of a guest molecule made of a quaternary ammonium salt is changed, the resulting clathrate hydrate has a varied melting point.

In addition, in PTL 3, the dissociation temperature is adjusted by mixing a plurality of clathrate hydrates of a specific quaternary alkyl salt to form a eutectic crystal thereof.

CITATION LIST

Patent Literature

PTL 1: Japanese Unexamined Patent Application Publication No. 57-35224
PTL 2: International Publication No. WO2015/076095
PTL 3: Japanese Unexamined Patent Application Publication No. 2007-186667

Non Patent Literature

NPL 1: Journal of Structural Chemistry, Vol. 43, No. 6, 990-994, 2002

SUMMARY OF INVENTION

Technical Problem

In the method described in NPL 1, although a certain correlation is observed between the melting point and the type of a clathrate hydrate by changing the chemical structure, this correlation is discontinuous, and it is difficult to find a guest molecule having an arbitrary melting point.

In addition, in the method described in PTL 3, the combination of clathrate hydrates forming a eutectic crystal is restrictive, and the melting point can be controlled only within the range of the melting points of each of the clathrate hydrates to be mixed. In particular, a clathrate hydrate having a melting point of about 0° C. is significantly rare, and it is significantly difficult to control the melting point to 0° C. to 6° C.

The present invention has been made in view of the above circumstances, and it is an object thereof to provide a latent heat storage material having a melting point within a prescribed temperature range; above; a cold storage tool using the latent heat storage material; a logistic packaging container, a human body refrigeration tool, and a beverage cold storage tool each using the cold storage tool; and a method for transporting an object to be kept cold using the logistic packaging container.

Solution to Problem

The present inventors have diligently studied to solve the above-described problems and as a result, have revealed that a crystalline compound consisting of a compound (A)—inorganic salt (B)—water ternary system is obtained by adding a specific inorganic salt (B) to a clathrate hydrate of a specific compound (A) and have applied the compound to a latent heat storage material.

The present invention includes the following aspects [1] to [19]:

[1]. A latent heat storage material comprising a compound (A) represented by the following formula (A), an inorganic salt (B) represented by the following formula (B) and composed of a cation of an alkali metal and an anion of the same element as the anion of the compound (A), and water, wherein the compound (A) is a material that forms a clathrate hydrate together with the water, the composition ratio of the compound (A) and water is a composition ratio that gives a congruent melting point of the clathrate hydrate, and the molar ratio of the inorganic salt (B) to the compound (A) is 0.1 or more and 10 or less, $$AR_4^+X^-  \quad \text{formula (A)},$$

$$M^+X^- \quad \text{formula (B)}$$

(in formula (A), A is N or P, R is a C1-10 alkyl group, and $X^-$ is $F^-$, $Cl^-$, $Br^-$, $I^-$, $NO_3^-$, $CH_3COO^-$, $CH_3CH_2COO^-$, $CH_3CH_2CH_2COO^-$, $CH_2{=}CHCOO^-$, or $PO_4^{3-}$;

in formula (B), $M^+$ is $K^+$, $Rb^+$, or $Cs^+$, and X is $F^-$, $Cl^-$, $Br^-$, $I^-$, $NO_3^-$, $CH_3COO^-$, $CH_3CH_2COO^-$, $CH_3CH_2CH_2COO^-$, $CH_2{=}CHCOO^-$, or $PO_4^{3-}$);

[2] The latent heat storage material according to aspect [1], wherein the compound (A) is a quaternary ammonium salt;

[3] The latent heat storage material according to aspect [1] or [2], wherein the compound (A) is tetrabutylammonium bromide;

[4] The latent heat storage material according to aspect [3], wherein the molar ratio of water to the tetrabutylammonium bromide is 22 or more and 32 or less;

[5] The latent heat storage material according to any one of aspects [1] to [4], wherein the alkali metal is potassium;

[6] The latent heat storage material according to aspect [5], wherein the inorganic salt (B) is potassium bromide;

[7] The latent heat storage material according to any one of aspects [1] to [6], wherein the compound (A) is tetrabutylammonium bromide, and the inorganic salt (B) is potassium bromide;

[8] The latent heat storage material according to aspect [7], wherein the molar ratio of the potassium bromide to the tetrabutylammonium bromide is 0.5 or more;

[9] The latent heat storage material according to aspect [7] or [8], wherein the molar ratio of the potassium bromide to the tetrabutylammonium bromide is 0.75 or more;

[10] The latent heat storage material according to any one of aspects [7] to [9], wherein the molar ratio of the potassium bromide to the tetrabutylammonium bromide is less than 1.5;

[11] The latent heat storage material according to aspect [4], wherein the compound (A) is tetrabutylammonium bromide, and the inorganic salt (B) is cesium bromide;

[12] The latent heat storage material according to aspect [1] or [2], wherein the compound (A) is tetrabutylammonium chloride, and the inorganic salt (B) is potassium chloride;

[13] A cold storage tool for cooling an object to be kept cold, the cold storage tool comprising the latent heat storage material according to any one of aspects [1] to [12] and an accommodation portion for accommodating the latent heat storage material in a liquid-tight state;

[14] The cold storage tool according to aspect [13], comprising a plurality of the accommodation portions and a joint for connecting the plurality of the accommodation portions;

[15] A logistic packaging container comprising the cold storage tool according to aspect [13] or [14];

[16] A human body refrigeration tool comprising the cold storage tool according to aspect [123] or

[17] A beverage cold storage tool comprising the cold storage tool according to aspect [1-23] or

[18] A cooling method by surrounding an object to be kept cold with the cold storage tool according to aspect [14] along a circumferential direction of a first axis that is assumed to pass through the object to be kept cold; and

[19] The cooling method according to aspect [18], wherein the object to be kept cold is surrounded by the cold storage tool along a circumferential direction of a second axis that is assumed to pass through the object to be kept cold and to intersect the first axis.

Advantageous Effects of Invention

According to the present invention, it is possible to provide a latent heat storage material having a melting point within a prescribed temperature range; a cold storage tool using the latent heat storage material; a logistic packaging container, a human body refrigeration tool, and a beverage cold storage tool each using the cold storage tool; and a method for transporting an object to be kept cold using the logistic packaging container.

DESCRIPTION OF EMBODIMENTS

First Embodiment

Latent Heat Storage Material

Figure 1A:
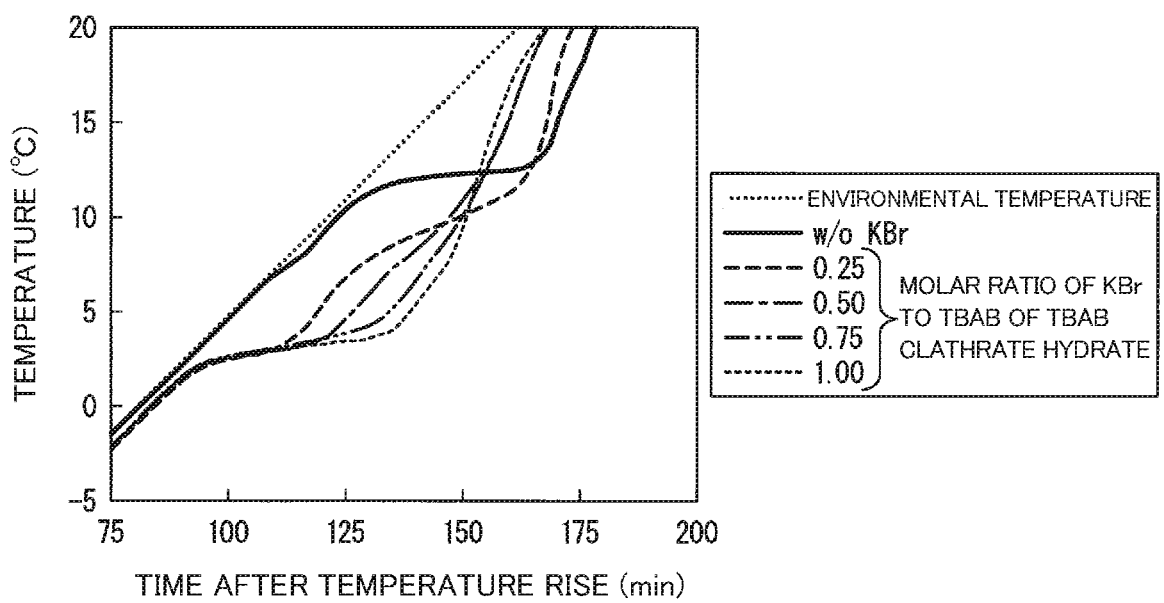
FIG. 1A is a graph showing melting behaviors when potassium bromide is added to a TBAB clathrate hydrate.

The present embodiment relates to a latent heat storage material including a compound (A) represented by the following formula (A), an inorganic salt (B) represented by the following formula (B) and composed of a cation of an alkali metal and an anion of the same element as the anion of the compound (A), and water.

The compound (A) is a material that forms a clathrate hydrate together with the water.

The composition ratio of the compound (A) and water is a composition ratio that gives a congruent melting point of the clathrate hydrate.

The molar ratio of the inorganic salt (B) to the compound (A) is 0.1 or more and 10 or less.

$$AR_4^+X^-  \quad \text{formula (A),}$$

$$M^+X^- \quad \text{formula (B)}$$

(in formula (A), A is N or P, R is a C1-10 alkyl group, and $X^-$ is $F^-$, $Cl^-$, $Br^-$, $I^-$, $NO_3^-$, $CH_3COO^-$, $CH_3CH_2COO^-$, $CH_3CH_2CH_2COO^-$, $CH_2$=$CHCOO^-$, or $PO_4^{3-}$;

in formula (B), $M^+$ is $K^+$, $Rb^+$, or $Cs^+$, and $X^-$ is $F^-$, $Cl^-$, $Br^-$, $I^-$, $NO_3^-$, $CH_3COO^-$, $CH_3CH_2COO^-$, $CH_3CH_2CH_2COO^-$, $CH_2$=$CHCOO^-$, or $PO_4^{3-}$);

The latent heat storage material of the present embodiment has a crystal system (eutectic crystal) composed of a compound (A)—inorganic salt (B)—water ternary compound system.

The latent heat storage material of the present embodiment is not a mixture composed of the respective single crystals of simple substances of a compound (A), an inorganic salt (B), and water and has a novel crystal structure. Consequently, it is possible to provide a latent heat storage material having a melting point within a desired temperature range.

In the present specification, the term "clathrate hydrate" refers to a compound in which a guest molecule is encapsulated within a cage-shaped clathrate lattice composed of water molecules (host molecule) and crystallizes.

In the present specification, the term "semi-clathrate hydrate" refers to a compound in which a relatively large ionic guest molecule represented by an alkylammonium salt is encapsulated within a cage-shaped clathrate lattice of water molecules (host molecule) and crystallizes in a state in which the hydrogen bonds in the clathrate lattice are partially broken. In the description below, the term "clathrate hydrate" includes "semi-clathrate hydrate".

Compound (A)

In the present embodiment, the compound (A) is represented by the following formula (A):

$$AR_4^+X^- \quad \text{formula (A)}$$

(in formula (A), A is N or P, R is a C1-10 alkyl group, and $X^-$ is $F^-$, $Cl^-$, $Br^-$, $I^-$, $NO_3^-$, $CH_3COO^-$, $CH_3CH_2COO^-$, $CH_3CH_2CH_2COO^-$, $CH_2$=$CHCOO^-$, or $PO_4^{3-}$).

In formula (A), the alkyl group represented by R preferably has 1 to 8 carbon atoms, more preferably 1 to 6, and more preferably 1 to 5 carbon atoms.

More specifically, R is preferably a methyl group, an ethyl group, a propyl group, or a butyl group.

In the present embodiment, the compound (A) is preferably a quaternary ammonium salt or a quaternary phosphonium salt. The quaternary ammonium salt is not significantly toxic, and its hydrate is a typical example of a semi-clathrate hydrate including a non-gas guest compound (guest molecule).

The quaternary ammonium salt is preferably a tetrabutylammonium salt, a tributylpentylammonium salt, or a tetraisoamylammonium salt.

The quaternary phosphonium salt is preferably a tetrabutylphosphonium salt.

In the present embodiment, the compound (A) is preferably tetrabutylammonium bromide (hereinafter, referred to as "TBAB") or a tetrabutylammonium chloride (hereinafter, referred to as "TBAC"). Since a halide salt of tetrabutylammonium as mentioned above is a primary product of a Menschutkin reaction of a tertiary amine and a halogenated alkane and can be easily synthesized, the manufacturing cost thereof is low compared to other anion salts. In addition, the Menschutkin reaction is a nucleophilic reaction, and the synthesis is easy in the order of an iodide salt, a bromide salt, and a chloride salt. For example, since an iodide salt of tetrabutylammonium, which is a typical quaternary ammonium salt, is poorly water soluble, it is difficult to form a clathrate hydrate. Consequently, TBAB that is a bromide salt of tetrabutylammonium is more preferred because of ease of its manufacturing and ease of formation of a clathrate hydrate.

It is known that clathrate hydrates of the compound (A) such as quaternary ammonium salts are generated under normal pressure and generate heat during the generation. At the same time, it is known that clathrate hydrates of the compound (A) absorb heat when dissociated, and the heat generation and heat absorption can be used as latent heat. The latent heat storage material of the present embodiment uses a compound (A) forming a clathrate hydrate, such as TBAB or TBAC, and a eutectic crystal of the compound (A), an inorganic salt (B), and water also generates heat when produced and absorbs heat when dissociated. That is, the generation of heat and the absorption of heat in a eutectic crystal of a compound (A), an inorganic salt (B), and water can be used as latent heat.

In particular, among the compounds (A), TBAB is low in manufacturing cost and easily forms a clathrate hydrate. Consequently, TBAB is preferably used as a raw material for a latent heat storage material.

The generation and dissociation of a latent heat storage material of the present embodiment are similar to, for example, a phase change from a solid such as ice to a liquid such as water. Because of this reason, in the present specification, dissolution of a latent heat storage material of the present embodiment may be referred to as "melting". The temperature at which a latent heat storage material of the present embodiment starts to melt may be referred to as "melting start temperature". A method for measuring the melting start temperature will be described later. In addition, the intermediate temperature between the start of melting and the end of melting may be referred to as melting point. A measuring method thereof will be described later.

Inorganic Salt (B)

In the present embodiment, the inorganic salt (B) is represented by the following formula (B):

$$M^+X^-  \qquad \text{formula (B)}$$

in formula (B), $M^+$ is $K^+$, $Rb^+$, or $Cs^+$, and $X^-$ is $F^-$, $Cl^-$, $Br^-$, $I^-$, $NO_3^-$, $CH_3COO^-$, $CH_3CH_2COO^-$, $CH_3CH_2CH_2COO^-$, $CH_2=CHCOO^-$, or $PO_4^{3-}$).

In formula (B), M is preferably an alkali metal showing negative hydration. M is potassium, rubidium, or cesium and is preferably potassium. Potassium is preferred because it has a high Clark number (the ratio of the element existing near on the surface of the earth) compared to other elements, its bromide salt and chloride salt are easily available, and the material cost is low.

In the present embodiment, the inorganic salt (B) is preferably, for example, potassium bromide, cesium bromide, or potassium chloride, and more preferably potassium bromide.

Here, "showing negative hydration" means to follow Samoilov's theory and indicates an ion that acts such that the residence time of a water molecule in contact with the ion is shorter than the residence time of a water molecule at an equilibrium position in pure water, and water molecules around an ion showing negative hydration are in a disordered state. Also for this reason, the ion is called a structural destruction ion.

The residence time $\tau_1$ of a water molecule in contact with an ion at an equilibrium position and the residence time $\tau_0$ of a water molecule at an equilibrium position in pure water give (expression 1):

$$\tau_1/\tau_0 = \exp(\Delta E_1/RT) \qquad \text{(expression 1).}$$

Here, $\Delta E_1$ is the difference between the activation energy when a water molecule in contact with an ion jumps to another equilibrium position not adjacent to an ion and the activation energy of a water molecule in pure water. That is, when the $\Delta E_1$ in expression 1 is negative, $\tau_1/\tau_0 < 1$, i.e., the residence time of a water molecule in contact with an ion is shorter than the residence time of a water molecule at an equilibrium position in pure water, and negative hydration is shown.

In contrast, when the $\Delta E_1$ is positive, $\tau_1/\tau_0 > 1$, i.e., the residence time of a water molecule in contact with an ion is longer than the residence time of a water molecule at an equilibrium position in pure water, and positive hydration is shown. The $\Delta E_1$ of each ion has been approximately determined by Samoilov, et al. In alkali metals, Li: 390 cal/mol, Na+: 170 cal/mol, K+: −200 cal/mol, Rb+: −300 cal/mol, and Cs+: −340 cal/mol, and potassium, rubidium, cesium ions show negative hydration.

In the present embodiment, when an alkali metal that becomes the cation of the inorganic salt (B) shows negative hydration when ionized, the compound (A), the inorganic salt (B), and water form a crystal system (eutectic crystal), and it is easy to obtain a latent heat storage material having a melting start temperature that is different from the melting points of these three molecules and the melting start temperatures of eutectic crystals composed of two molecules of the three molecules (for example, a clathrate hydrate of the compound (A)).

In addition, the alkali metal anion showing negative hydration is the anion of the same element of the anion of the compound (A). When the anion is of a different element, the anion of the compound (A) may be ion-exchanged with the anion of the inorganic salt (B), resulting in complication of the crystal system. Consequently, the difference between the melting start temperature and the end temperature may increase. However, when the anions are of the same element, the eutectic state is simplified, and the difference between the melting start temperature and the melting end temperature can be decreased by adjusting the ratio of the compound (A), the inorganic salt (B), and water.

In addition, in the present embodiment, it is possible to verify whether a crystal system (eutectic crystal) is formed in a solid phase state by observing a characteristic diffraction pattern in X-ray diffraction (XRD) measurement in the solid phase state.

In addition, in the present embodiment, it is possible to verify whether a compound (A), an inorganic salt (B), and water are contained by identifying ion species constituting each compound by ion chromatography measurement or ion test paper. In addition, it is also possible to identify the components and the composition by evaporating the water contained in the latent heat storage material of the present embodiment with an evaporator or the like and then subjecting the resulting solid content to X-ray photoelectron spectroscopy, infrared spectroscopy, or nuclear magnetic resonance method.

In the present embodiment, the ratio of the quaternary alkyl salt (A) and the water molecules is a concentration allowing formation of a clathrate hydrate and is preferably a concentration providing a so-called congruent melting point in the present invention. For example, when the quaternary alkyl salt is TBAB, the proportion of water molecules is preferably 22 mol or more and 32 mol or less with respect to one molecule of TBAB. In the case of TBAC, the proportion of water molecules is preferably 24 mol or more and 36 mol or less. In the case of tetrabutylammonium nitrate, the proportion of water molecules is preferably 20 mol or more and 50 mol or less. In the case of tetrabutylphosphonium bromide, the proportion of water molecules is preferably 30 mol or more and 60 mol or less.

In general, in the formation of a clathrate hydrate of a quaternary alkyl salt, it is known that when the proportion of water molecules with respect to the quaternary alkyl salt is high, the solid clathrate hydrate of the quaternary alkyl salt and a large amount of excess water are mixed with each other to form slurry. Since such slurry contains a large amount of water, the latent heat amount resulting from the generation and dissociation of the clathrate hydrate is small.

Specifically, when the quaternary alkyl salt is TBAB and the molar ratio of water molecules to TBAB is 70 mol or more (the weight concentration is less than 20 wt %), slurry is formed, and the latent heat amount resulting from the generation and dissociation of the clathrate hydrate is small, about 40 J/g.

In contrast, when the proportion of water molecules with respect to the quaternary alkyl salt is low, the weights of the quaternary alkyl salt and the inorganic salt that cannot be dissolved in water and precipitate at room temperature are increased. Since the precipitated quaternary alkyl salt and inorganic salt do not contribute to the latent heat amount resulting from the generation and dissociation of the enteritic crystal composed of the compound (A), the inorganic salt (B), and water, the latent heat amount per mass is decreased.

As described above, although the latent heat amount changes depending on the ratio of water molecules, the latent heat storage material according to the present invention mainly utilizes the latent heat resulting from the generation and dissociation of a eutectic crystal composed of a compound (A), an inorganic salt (B), and water, and the latent heat amount is about 120 J/g or more.

FIG. 1A is a graph showing melting behaviors with respect to the amounts of potassium bromide (KBr) as a bromide salt of an alkali metal showing negative hydration added to a TBAB clathrate hydrate (molar ratio of water to TBAB is 26.3) as an example of the present embodiment. When a small amount (0.25 mol) of KBr is added to a TBAB clathrate hydrate, the melting point appears at about 3° C.

In addition, it is preferable that 0.5 mol or more of KBr is added to a TBAB clathrate hydrate, because a single melting point appears and the melting points of other components do not appear within a normal operating temperature range (−20° C. to 30° C.).

Incidentally, when 1.5 mol or more of KBr is added to a TBAB clathrate hydrate, KBr is dissolved to saturation and precipitates at a temperature of generating a eutectic crystal composed of a compound (A), an inorganic salt (B), and water. When a further larger amount of KBr is added, since the precipitated KBr does not change the phase within a normal operating temperature range (−20° C. to 30° C.) and does not function as a latent heat storage material, the latent heat amount simply decreases. Accordingly, an amount of less than 1.5 mol is preferable. In addition, it is also stable against a change in environmental temperature.

It is demonstrated from the results shown in FIG. 1A that it is preferable that the molar ratio of an alkali metal salt to TBAB is 0.75 or more because the time maintaining the melting point at 3° C. is the longest and the latent heat amount is increased.

Figure 1B:
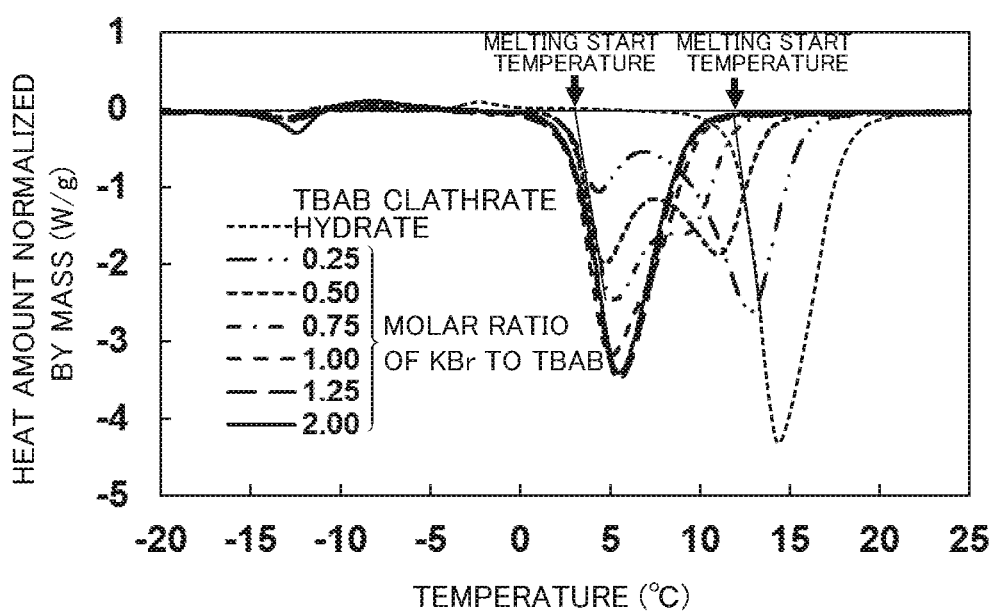
FIG. 1B is a graph showing the results in the temperature rising process of differential scanning calorimetry (DSC) when potassium bromide is added to a TBAB clathrate hydrate.

FIG. 1B is a graph showing the results of DSC when KBr is added to a TBAB clathrate hydrate at a variety of molar ratios to TBAB (molar ratio of water to TBAB is 26.3) as an example of the present embodiment. The measurement conditions are as described below and are those when the temperature is raised.

First, the DSC of a TBAB clathrate hydrate not containing KBr shows a single endothermic peak, and the melting start temperature is about 12° C. Secondly, when 0.25 mol of KBr is added to TBAB, two endothermic peaks appear, and the melting start temperature of the peak in a low temperature zone is about 3° C. Furthermore, when the molar ratio of KBr to TBAB is increased, the peak in a high temperature zone shifts to the lower temperature side and overlaps with the peak of the lower temperature.

When the molar ratio of KBr to TBAB is 0.75 or more, a single peak appears in a low temperature zone, and when the molar ratio is 1.0 or more, the peak has a narrower half-value width. The addition amount is further increased, and when the molar ratio reaches 1.25, the half-value width is further decreased, and the peak shape does not change even if the addition amount is further increased. That is, when the molar ratio is 1.25 or more, the half-value width of the endothermic peak is decreased, the difference between the melting start temperature and the melting end temperature is decreased as described below, and the eutectic crystal composed of TBAB, KBr, and water melts as soon as the temperature is increased and reaches the melting start temperature and maintains a constant temperature of about 3° C.

The composition ratio of the compound (A) and water is a composition ratio that gives a congruent melting point of the clathrate hydrate.

The molar ratio of the inorganic salt (B) to the compound (A) is 0.1 or more and 10 or less.

Composition Ratio of Compound (A) and Water

In the latent heat storage material of the present embodiment, the molar ratio of water to the compound (A) is adjusted within a range that gives a congruent melting point of a clathrate hydrate formed by the compound (A) and water. Such a molar ratio of water to the compound (A) is, when the compound (A) is TBAB, 22 or more and 32 or less, preferably 24 or more and 30 or less, and more preferably 26 or more and 30 or less. Consequently, a latent heat storage material having a melting start temperature within a prescribed temperature range can be obtained. In addition, it is possible to increase the latent heat amount of the resulting latent heat storage material.

In contrast, when the molar ratio of water to the compound (A) is not higher than the lower limit value, the compound (A) and the inorganic salt (B) precipitate and are crystallized to easily generate a eutectic crystal. These compounds do not cause a phase change within a normal operating temperature range (−20° C. to 30° C.) and do not function as a latent heat storage material. Accordingly, as a result, the latent heat amount of the latent heat storage material is readily decreased.

When the molar ratio of water to the compound (A) is not lower than the upper limit value, the amount of water is excessive, and a water crystal (ice) and a eutectic crystal with the compound (A) or the inorganic salt (B) are readily generated. These compounds have melting start temperatures different from that of the eutectic crystal of the compound (A), the inorganic salt (B), and water in the present embodiment. Consequently, since the proportion of the eutectic crystal of the compound (A), the inorganic salt (B), and water in the latent heat storage material of the present embodiment decreases, the latent heat amount at the melting start temperature of the eutectic crystal of the compound (A), the inorganic salt (B), and water of the latent heat storage material is decreased.

Ratio of Inorganic Salt (B) to Compound (A)

In the present embodiment, the ratio of the inorganic salt (B) to the compound (A) is 0.1 or more and 10 or less.

From the viewpoint of increasing the latent heat amount of the resulting latent heat storage material, the ratio of the inorganic salt (B) to the compound (A) is preferably 0.5 or more and less than 1.5.

When the compound (A) is TBAB and the inorganic salt (B) is potassium bromide, the molar ratio of potassium bromide to TBAB is preferably 0.5 or more and more preferably 0.75 or more.

In addition, the molar ratio of potassium bromide to TBAB is preferably less than 1.5.

When the molar ratio of potassium bromide to TBAB is less than 0.5, the proportion of the eutectic crystal of TBAB, potassium bromide, and water in the latent heat storage material of the present embodiment decreases, and the proportion of the clathrate hydrate of TBAB increases. The clathrate hydrate of TBAB has a melting start temperature of about 12° C., which is different from the melting start temperature of the eutectic crystal of TBAB, potassium bromide, and water. Accordingly, the latent heat value at the melting start temperature of the eutectic crystal of TBAB, potassium bromide, and water is decreased. Consequently, the latent heat storage material has multiple melting start temperatures. As described later, when the latent heat storage material of the present embodiment is used as a cold storage tool, it is difficult to cool at the melting point of the eutectic crystal of TBAB, potassium bromide, and water. In addition, if the molar ratio of the inorganic salt (B) to the compound (A) is less than 0.1, although it depends on the combination of the compound (A) and the inorganic salt (B), in general, the proportion of the eutectic crystal of the compound (A), the inorganic salt (B), and water in the latent heat storage material of the present embodiment decreases, and the latent heat amount at the melting start temperature of the eutectic crystal of the compound (A), the inorganic salt (B), and the water of the latent heat storage material is decreased.

When the molar ratio of potassium bromide to TBAB is higher than 1.5, a part of the potassium bromide cannot be dissolved in water and precipitates. In addition, if the molar ratio of the inorganic salt (B) to the compound (A) is 10 or more, although it depends on the combination of the compound (A) and the inorganic salt (B), in general, they cannot dissolve in water and precipitate. The precipitated compounds do not cause a phase change within a normal operating temperature range (−20° C. to 30° C.) and do not function as a latent heat storage material. Accordingly, the latent heat amount at the melting start temperature of the eutectic crystal of the compound (A), the inorganic salt (B), and water of the latent heat storage material is decreased.

From the viewpoint of decreasing the manufacturing cost of the latent heat storage material, the molar ratio of potassium bromide to TBAB is preferably 0.6 or more, and the molar ratio of water to TBAB is preferably 25 or more. In general, since the manufacturing cost of TBAB is high compared to potassium bromide and water, the manufacturing cost tends to decrease with an increase in the molar ratios of potassium bromide and water.

From the viewpoint of increasing the latent heat amount of the latent heat storage material and decreasing the manufacturing cost of the latent heat storage material, the molar ratio of potassium bromide to TBAB is preferably 0.6 or more and 1.3 or less, and the molar ratio of water to TBAB is preferably 25 or more and 30 or less.

The melting start temperature of the latent heat storage material of the present embodiment is higher than 0° C. and 28° C. or less. The melting start temperature of the present embodiment is different from the melting start temperatures of the compound (A), the inorganic salt (B), water, the clathrate hydrate of the compound (A), and the eutectic crystal of the inorganic salt (B) and water. For example, the melting start temperature of the eutectic crystal of TBAB, potassium bromide, and water is about 3° C. and is different from all of the melting start temperatures of TBAB (melting start temperature: about 103° C.), potassium bromide (melting start temperature: 730° C.), water (melting start temperature: −0.5° C.), the clathrate hydrate of TBAB (melting start temperature: about 12° C.), and the eutectic crystal of potassium bromide and water (melting start temperature: less than 0° C.)

In the present specification, the melting start temperature and the melting end temperature of a latent heat storage material are values obtained by differential scanning calorimetry (DSC). Specifically, about 4 mg of a latent heat storage material in a liquid phase state is enclosed in an aluminum pan for DSC measurement, the temperature is then lowered at a rate of 5° C./rain to change the phase from the liquid phase state to the solid phase state, and the temperature is then raised at a rate of 5° C./rain. On this occasion, an endothermic peak appears in the DSC curve when the phase changes from the solid phase state to the liquid phase state. The temperature determined by extrapolating the temperature at which the endothermic peak starts to the baseline is defined as the melting start temperature, and the temperature determined by extrapolating the temperature at which the endothermic peak ends to the baseline is defined as the melting end temperature.

The latent heat amount of a latent heat storage material is the value obtained by DSC. Specifically, the value obtained by dividing the area of the above-described endothermic peak by the mass of the sample is defined as the latent heat amount. In addition, unless otherwise specified, the latent heat amount of the present invention means the latent heat amount per unit mass (J/g).

The melting point of a latent heat storage material is determined by the following method.

First, about 5 g of a latent heat storage material is weighed and is poured in a glass tube bottle. The temperature of the central portion of the latent heat storage material in the glass tube bottle is measured with a thermocouple, and the glass tube bottle is accommodated in a thermostat having a temperature adjustment function under room temperature.

Secondly, the temperature inside the thermostat is cooled down to −20° C. to freeze the latent heat storage material, and the temperature is raised from −20° C. to 30° C. at a rate of 0.25° C./min. On this occasion, the time at which the temperature starts to rise is defined as 0 hour, and a graph of melting behavior of the latent heat storage material with respect to the temperature rising time is obtained.

In the resulting graph of melting behavior, the temperature of the latent heat storage material is differentiated by the temperature rising time, and the intermediate temperature between the temperature of the latent heat storage material at the time giving a differential value of zero earliest during the measurement time and the temperature of the latent heat storage material at the time giving a differential value of zero latest during the measurement time is defined as the melting point.

From the above, the latent heat storage material of the present embodiment has a melting point within a prescribed temperature range.

Method for Manufacturing Latent Heat Storage Material

The latent heat storage material of the present embodiment is obtained by mixing a compound (A), an inorganic salt (B), and water at a prescribed ratio. Although the order of mixing is arbitrary, a latent heat storage material is obtained by putting a compound (A) and an inorganic salt (B) in a container, then adding water thereto, and sufficiently stirring for homogenization.

Examples of the component that is optionally contained in the latent heat storage material of the present embodiment include thickeners such as xanthan gum, guar gum, carboxymethyl cellulose, and sodium polyacrylate. In addition, when the latent heat storage material of the present embodiment has a freezing temperature lower than the melting point, i.e., shows supercooling, a supercooling prevention agent may be included. In addition, a dye may be included for detecting liquid leakage. Incidentally, the materials of the present invention are not limited to the materials exemplified above.

Second Embodiment

Cold Storage Tool

A cold storage tool using the above-described latent heat storage material will now be described based on FIGS. 3 and 4.

Incidentally, in the drawings used in the following description, characteristic parts may be enlarged for convenience for the purpose of emphasizing the characteristic parts, and the dimensional ratios of the respective components may not be the same as the actual ones. In addition, for the same purpose, parts that are not characteristic may be omitted in the drawings.

The cold storage tool of the present embodiment cools an object to be kept cold. Examples of the object to be kept cold include food, medicine, and human bodies. Examples of the food include greengrocery such as vegetables and fruits, dairy products such as milk, processed foods such as ham, and beverages such as wine and champagne. In addition, the cold storage tool of the present embodiment may cool a closed space such as a refrigerator and a packing container or an open space for the purpose of, for example, air conditioning.

In the case of greengrocery, the storage temperature is said to be higher than 0° C. and 15° C. or less. In contrast, in the case of refrigerated products including dairy products such as milk and processed foods such as ham, the storage temperature is said to be higher than 0° C. and 10° C. or less. In the case of medicine, the storage temperature is said to be 2° C. or more and 8° C. or less.

Figure 3:
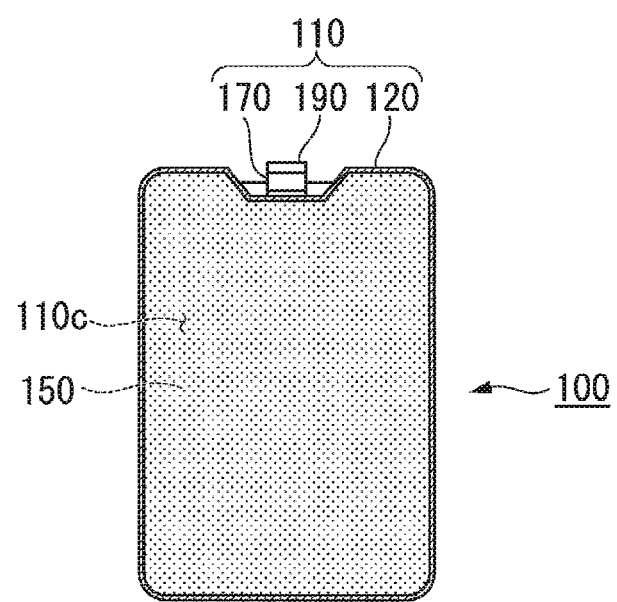
FIG. 3 is a plan view of a cold storage tool 100 of a second embodiment.
Figure 4:
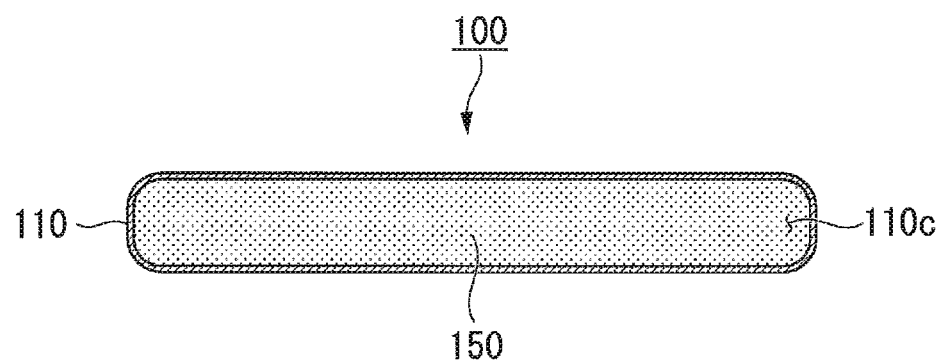
FIG. 4 is a cross-sectional view of a cold storage tool 100 of a second embodiment.

FIG. 3 is a plan view of a cold storage tool 100 of a second embodiment. FIG. 4 is a cross-sectional view of FIG. 3. As shown in FIGS. 3 and 4, the cold storage tool 100 includes a cold storage tool body 110 and a latent heat storage material 150. The cold storage tool 100 of the present embodiment is a so-called blow container type cold storage tool obtained by a method of injecting a latent heat storage material using a cylinder pump described later.

In the cold storage tool body 110, a latent heat storage material 150 is accommodated in an interior space 110c in a liquid-tight state.

The cold storage tool body 110 includes an accommodation member 120, an inlet 170, and a sealing member 190.

The accommodation member 120 is a member having a hollow structure. The accommodation member 120 is preferably made of a material having high rigidity. Consequently, in the phase change of the latent heat storage material 150 from the solid phase to the liquid phase, the accommodation member 120 is hardly deformed. Examples of such a material include resin materials, such as polyethylene, polypropylene, polyester, polyurethane, polycarbonate, polyvinyl chloride, and polyamide; metals, such as aluminum, stainless steel, copper, and silver; and inorganic materials, such as glass, china, and ceramic. The accommodation member 120 is preferably molded from a resin material from the viewpoint of ease of formation and durability of the accommodation member 120.

The accommodation member 120 may be wrapped with a film of, for example, polyethylene, polypropylene, polyester, polyurethane, polycarbonate, polyvinyl chloride, or polyamide. In order to enhance the durability and the barrier property of the film, a thin film of aluminum or silicon dioxide is preferably formed on the film. Furthermore, it is preferable to attach a sticker of a temperature indicating material to the accommodation member 120 because the temperature of the cold storage tool can be judged.

The inlet 170 in FIG. 3 is disposed in the upper portion of the accommodation member 120. In the method described later, the latent heat storage material 150 is injected to the inside of the accommodation member 120 from the inlet 170.

The inlet 170 is sealed by a sealing member 190.

The cold storage tool 100 of the present embodiment is brought near or into contact with an article (object to be kept cold), and it is thereby possible to control the temperature of the article or cool the article at a temperature near the melting start temperature of the latent heat storage material of the present invention.

Method for Manufacturing Cold Storage Tool

Figure 5:
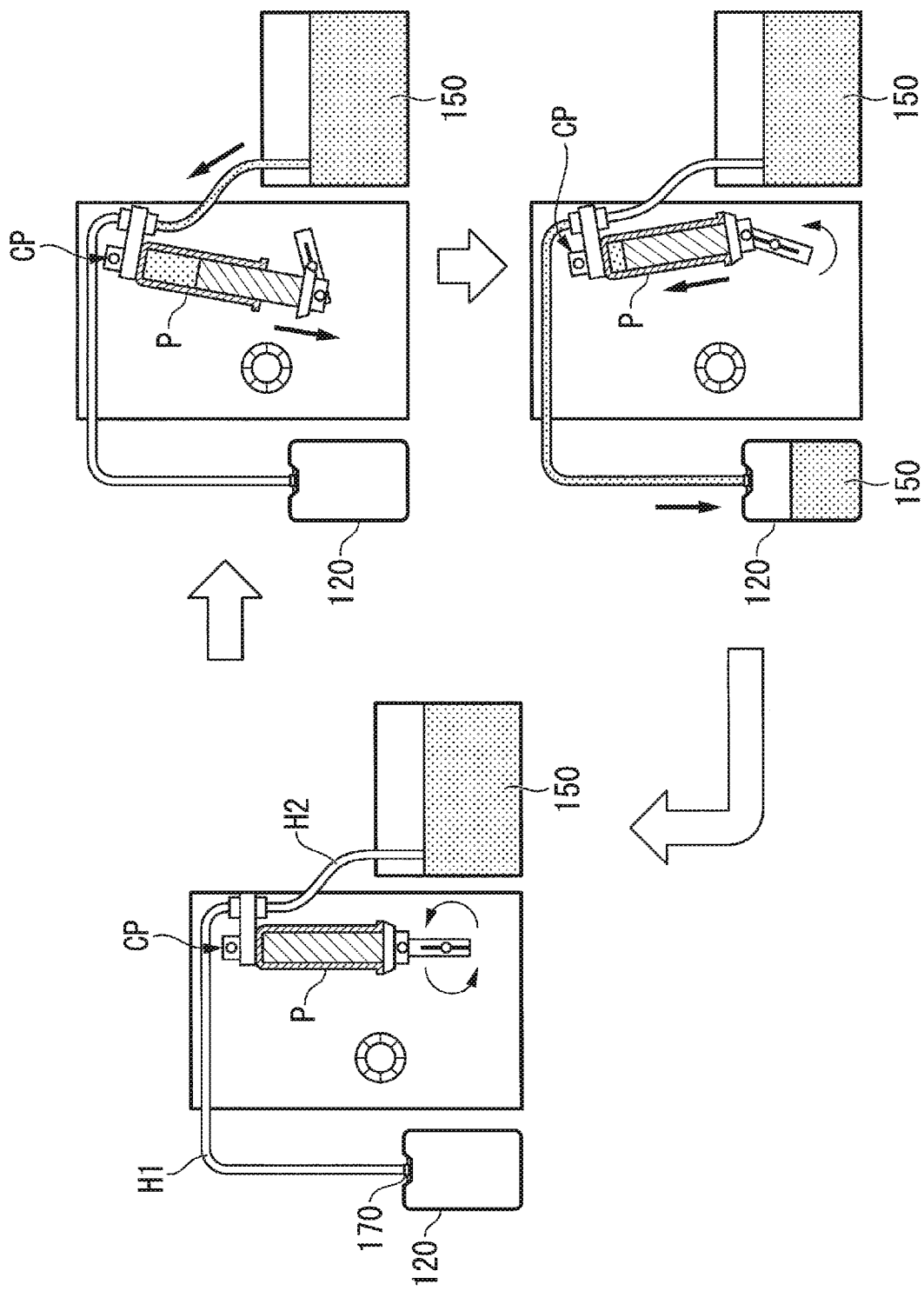
FIG. 5 is a conceptual diagram illustrating a process of manufacturing the cold storage tool 100 of the second embodiment.

An example of the method for manufacturing the cold storage tool 100 of the present embodiment will be described. FIG. 5 is a conceptual diagram illustrating a process of manufacturing the cold storage tool 100 of the second embodiment.

As shown in FIG. 5, the latent heat storage material 150 is injected to the accommodation member 120 through the inlet 170 using a cylinder pump CP. Incidentally, the method for injecting the latent heat storage material 150 is not limited thereto, and the method may be an injection method using a mohnopump.

Specifically, first, a filling hose H1 of a cylinder pump CP is set to the inlet 170 of an accommodation member 120, and a suction hose H2 is set to a container containing a latent heat storage material 150.

Secondly, the latent heat storage material 150 is sucked up by descending the piston P of the cylinder pump CP. Then, the inside of the piston P is filled with the latent heat storage material 150, and the latent heat storage material 150 is injected to the accommodation member 120 by raising the piston P.

The amount of the latent heat storage material 150 to be injected is not particularly limited and is preferably 70% or more and 90% or less of the inner volume of the accommodation member 120.

Further, the inlet 170 is sealed with a sealing member 190. As the sealing method using the sealing member 190, there are a method of stoppering by a known process such as ultrasonic welding or thermal welding and a method using the sealing member 190 of a screw plug that can be opened with a hand. Stoppering by, for example, ultrasonic welding or thermal welding is preferred because it does not have a risk of leakage of the latent heat storage material 150, etc.

Finally, the cold storage tool 100 is left to stand in a temperature environment not higher than the solidification temperature of the latent heat storage material 150 to solidify the latent heat storage material 150. Through such a process, the cold storage tool 100 of the present embodiment is manufactured.

Incidentally, as described here, although the latent heat storage material 150 may be solidified before the cold storage tool 100 is mounted on a logistic packaging container described later, when the temperature environment of the logistic packaging container can be controlled to a temperature not higher than the solidification temperature of the latent heat storage material 150 in the first step of the physical distribution process, it is possible to start using the latent heat storage material 150, even if it is in the liquid phase state, in the cold storage tool 100.

Logistic Packaging Container

A logistic packaging container using the cold storage tool 100 of the second embodiment will now be described based on FIG. 6.

Figure 6:
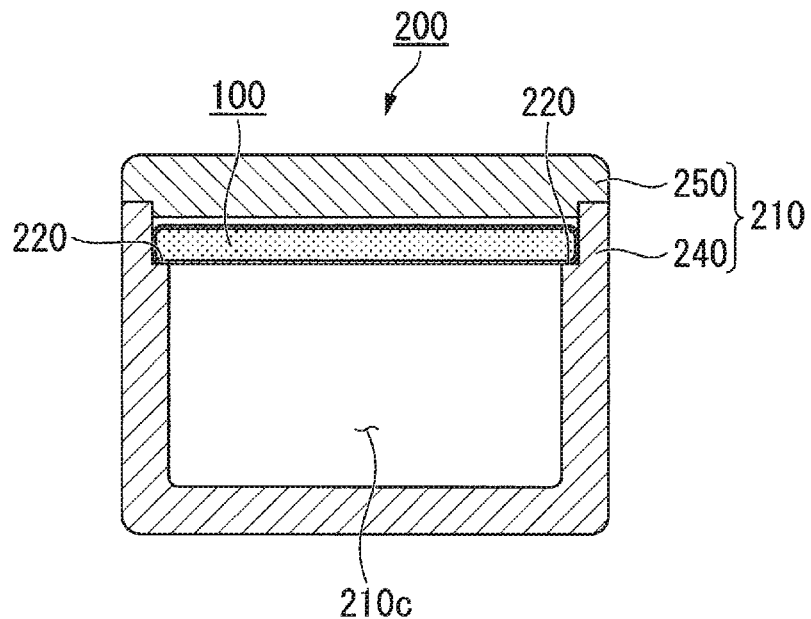
FIG. 6 is a cross-sectional view of a logistic packaging container 200 of the second embodiment.

FIG. 6 is a cross-sectional view of a logistic packaging container 200 of the second embodiment. The logistic packaging container 200 includes a logistic packaging container body 210 and a cold storage tool 100.

The logistic packaging container body 210 is a container having a size that can be carried by a person. The logistic packaging container body 210 is composed of a wall portion 240 and a lid portion 250.

The wall portion 240 has an opening for putting in and taking out an article and the cold storage tool 100. The wall portion 240 includes a cold storage tool holding portion 220 for holding the cold storage tool 100. The cold storage tool holding portion 220 is formed by cutting off the upper end of the wall portion 240 constituting the side face of the logistic packaging container body 210. The cold storage tool holding portion 220 is formed on the upper ends of the wall portion 240 facing each other. Incidentally, the cold storage tool holding portion may be formed on the upper end of the wall portion 240 over the whole circumference of the wall portion 240.

The cold storage tool holding portion 220 is disposed inside the logistic packaging container body 210. The logistic packaging container 200 is used by placing the cold storage tool 100 on the cold storage tool holding portion 220. Consequently, the temperature inside the logistic packaging container body 210 is maintained at about the melting point of the latent heat storage material of the cold storage tool 100. The cold storage tool holding portion 220 may have a structure capable of fixing the cold storage tool 100.

The wall portion 240 is preferably formed by a material having a heat insulating property, such as styrene foam, urethane foam, and a vacuum insulation material. An insulating layer formed by a material having a heat insulating property may be disposed on the inside or the outside of the body formed by a material without considering a heat insulating property.

The lid portion 250 closes the wall portion 240 that is open. The lid portion 250 is formed by a material mentioned as materials forming the wall portion 240. The lid portion 250 may be formed by the same material as or a different material from that of the wall portion 240.

The wall portion 240 and the lid portion 250 may be connected to each other or may be separated from each other. The lid portion 250 preferably has a structure adhering to the wall portion 240 for reducing the heat input to and output from the logistic packaging container 200.

The logistic packaging container body 210 has an interior space 210c capable of accommodating an article. The interior space 210c is a region surrounded by the wall portion 240 and the lid portion 250.

When an article is accommodated in the interior space 210c of the logistic packaging container body 210, the article is maintained at a temperature of about the melting point of the latent heat storage material.

Modification

Figure 7:
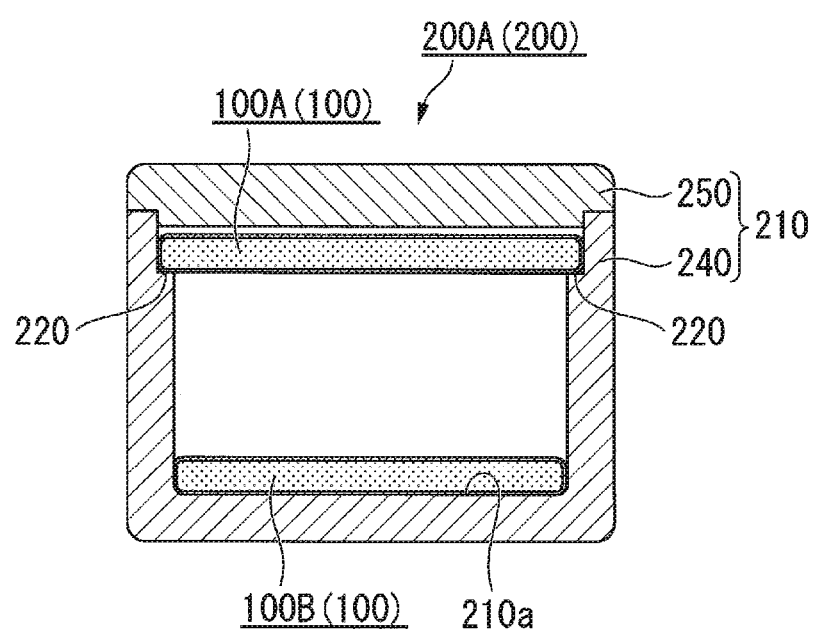
FIG. 7 is a cross-sectional view showing a modification 200A of the logistic packaging container of the second embodiment.

FIG. 7 is a cross-sectional view showing a modification 200A of the logistic packaging container of the second embodiment. As shown in FIG. 7, the logistic packaging container 200A includes two cold storage tools 100. In the logistic packaging container 200A, the two cold storage tools 100 face each other. One cold storage tool 100A is held by a cold storage tool holding portion 220. That is, in the logistic packaging container 200A, a part of the wall portion 240 functions as the holding member according to the accompanying claims. The other cold storage tool 100B is disposed on the bottom face inside the logistic packaging container body 210. Consequently, it is possible to prevent heat inflow from the bottom face 210a to the object X to be kept cold.

In addition, the cold storage tool 100 has little shape change in the phase change of the latent heat storage material from the solid phase to the liquid phase. Accordingly, in the logistic packaging container 200A, an object X to be kept cold can be stably held.

Here, there are three methods for transferring heat from a substance to another substance, i.e., convection, thermal conduction, and thermal radiation. Among them, it is inferred that thermal conduction has the least heat loss.

In the logistic packaging container 200A, the cold storage tool 100B is disposed at the position described above, and thereby an object X to be kept cold can be brought into contact with the cold storage tool 100B in the inside of the logistic packaging container body 210. It is inferred that when an object X to be kept cold and the cold storage tool 100B are brought into contact with each other, thermal conduction occurs between the object X to be kept cold and the cold storage tool 100B, and the object X to be kept cold is cooled down. In this case, there is almost no influence by heat inflow from the outside into the logistic packaging container 200A.

In contrast, when the cold storage tool 100 and an object X to be kept cold are separated from each other as in the logistic packaging container 200 shown in FIG. 6, it is inferred that heat convection occurs between the cold storage tool 100 and the object X to be kept cold to cool down the object X to be kept cold. This case is easily influenced by heat inflow from the outside into the logistic packaging container 200, and it is difficult to cool at a temperature extremely close to the melting point of the latent heat storage material.

Accordingly, the logistic packaging container 200A is less influenced by heat inflow compared to the logistic packaging container 200 and can easily control the temperature of an object X to be kept cold at a temperature close to the melting point of the latent heat storage material.

Incidentally, the latent heat storage materials of the cold storage tool 100A and the cold storage tool 100B may be the same or different.

Figure 8:
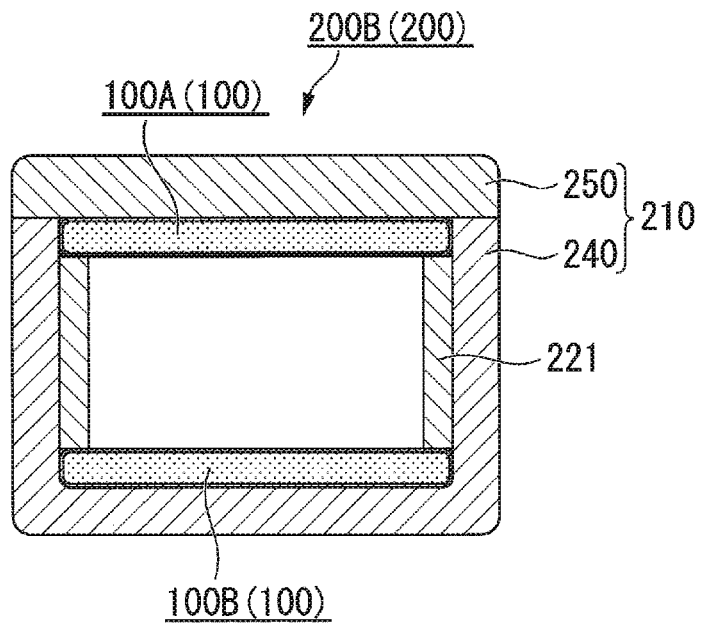
FIG. 8 is a cross-sectional view showing a modification 200B of the logistic packaging container of the second embodiment.

FIG. 8 is a cross-sectional view showing a modification 200B of the logistic packaging container of the second embodiment. The logistic packaging container 200B is different from the logistic packaging container 200A of FIG. 7 in that a cold storage tool holding member 221 is disposed on the side surface inside the logistic packaging container body 210. One cold storage tool 100A is held by the cold storage tool holding member 221. The other cold storage tool 100B is disposed on the bottom face inside the logistic packaging container body 210.

As in the logistic packaging container 200A of FIG. 7, the logistic packaging container 200B can easily control the temperature of an object to be kept cold compared to the logistic packaging container 200.

The logistic packaging container body of an aspect of the present invention may be a huge container such as a stowage. In addition, the logistic packaging container of an aspect of the present invention may be a container provided with a cooling system, such as a reefer container.

Figure 9:
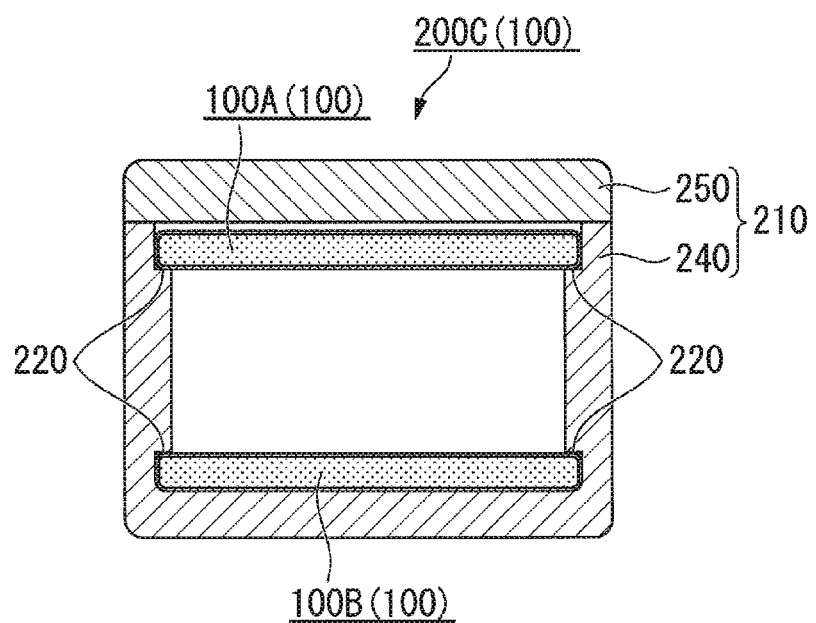
FIG. 9 is a cross-sectional view showing a modification 200C of the logistic packaging container of the second embodiment.

FIG. 9 is a cross-sectional view showing a modification 200C of the logistic packaging container of the second embodiment. It is different from the logistic packaging container 200A of FIG. 7 in that the cold storage tool holding portion 220 of the logistic packaging container 200C is formed by cutting off the upper end and the lower end of the wall portion constituting the side surface of the logistic packaging container body. Consequently, the positions of two cold storage tools 100 are stabilized, even if the logistic packaging container 200C of the present embodiment is used in a tilted posture.

As in the logistic packaging container 200A of FIG. 6, the logistic packaging container 200C can easily control the temperature of an object to be kept cold compared to the logistic packaging container 200.

The number of the cold storage tools provided to the logistic packaging container of an aspect of the present invention is not particularly limited and may be three or more.

In the logistic packaging container of an aspect of the present invention, the cold storage tool may be built in the logistic packaging container body. Alternatively, the cold storage tool itself may be a logistic packaging container.

In the logistic packaging container of an aspect of the present invention, the lid portion may include a cold storage tool holding portion.

Since the logistic packaging container 200 of the second embodiment includes the above-described cold storage tool 100, it can be used also for cooling greengrocery and refrigerated products and also for cooling medicine.

Third Embodiment

Cold Storage Tool

A cold storage tool using the above-described latent heat storage material will now be described based on FIGS. 10 and 11.

Figure 10:
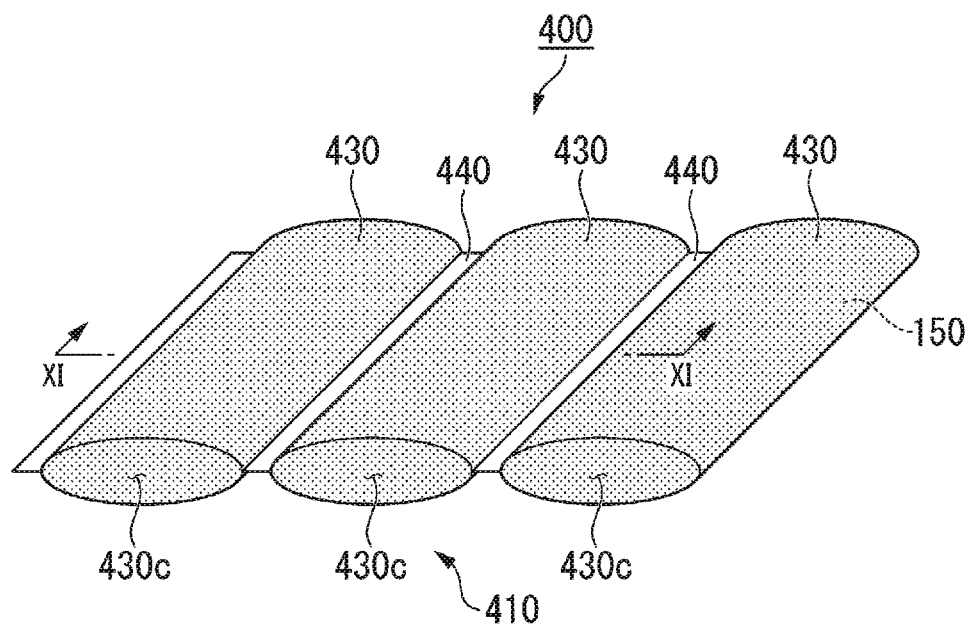
FIG. 10 is a perspective view showing a cold storage tool 400 of a third embodiment.

FIG. 10 is a perspective view showing a cold storage tool 400 according to a third embodiment. FIG. 11 is a cross-sectional view taken along the line XI-XI of FIG. 10. As shown in FIGS. 10 and 11, the cold storage tool 400 of the present embodiment includes a latent heat storage material 150 and a cold storage tool body 410. The cold storage tool 400 is a so-called film pack type cold storage tool. Accordingly, components in the present embodiment common to those in the second embodiment are designated by the same reference numerals, and detailed description thereof will be omitted.

The cold storage tool body 410 includes a plurality of accommodation portions 430 and a plurality of joints 440.

The accommodation portions 430 accommodate the latent heat storage material 150 in each interior space 430c in a liquid-tight state.

The accommodation portions 430 are each formed in a strip form. In FIG. 11, although the accommodation portions 430 each have a cross-section in an elliptical contour shape, the cross-section may be in another shape.

Figure 11:
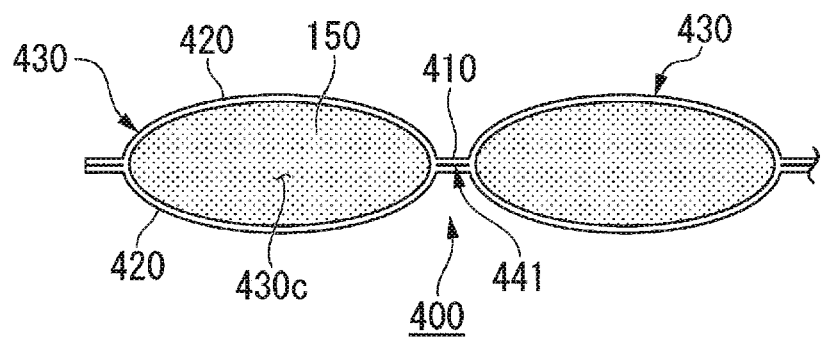
FIG. 11 is a cross-sectional view along the line XI-XI of FIG. 10.

Incidentally, although the number of the accommodation portions 430 in FIGS. 10 and 11 is three, the number is not limited thereto. The size of the cold storage tool 400 can be changed according to the size of an object to be kept cold by changing the number of the accommodation portions 430.

The joint 440 connects two accommodation portions 430 with each other and also has a joint function. The cold storage tool 400 has a plurality of joints 440 and thereby can come into contact with an object to be cooled (object to be kept cold) in a posture along the shape of the object to be kept cold even if the latent heat storage material 150 is in a solid phase state. Accordingly, even if the object to be kept cold has a complicated shape, the cold storage tool 400 can effectively cool the object to be cooled.

As shown in FIG. 11, the cold storage tool body 410 is constituted of film members 420. The film members 420 are joined to each other with a plurality of joining portions 441. The region of the film member 420 overlapping with the joining portion 441 in a planar view functions as the joint 440. The region of the film member 420 not overlapping with the plurality of joining portions 441 in a planar view functions as the accommodation portion 430.

The film member 420 is preferably formed by a material that can prevent leakage and volatilization of the latent heat storage material 150. In addition, the film member 420 is preferably formed by a material that can join the film members 420 to each other in the manufacturing method described later. Furthermore, the film member 420 is preferably formed by a material having softness that imparts a joint function to the joint 440.

From these viewpoints, the material for forming the film member 420 is preferably, for example, polyethylene, polypropylene, polyamide, or polyester. The film member 420 may be formed by a single material or by an arbitrary combination of two or more materials. In addition, the film member 420 may be constituted of a single layer or multiple layers.

The film member 420 is preferably constituted of a multilayer film composed of a low-density polyethylene resin layer and a polyamide resin layer. In this case, the joint 440 can be formed by stacking two multilayer films such that the low-density polyethylene resin layers face each other and thermocompression-bonding the contact surfaces of the low-density polyethylene resin layers to each other.

In order to enhance the durability and the barrier property of the film member 420, the film member 420 preferably includes a thin film of aluminum or silicon dioxide. Furthermore, it is preferable to attach a sticker of a temperature indicating material to the film member 420 because the temperature of the cold storage tool 400 can be judged.

In addition, for the purpose of increasing the physical strength, improving the touch, and increasing the heat insulating property of the cold storage tool 400, the film member 420 may have a so-called pack-in-pack structure in which the outside of the film member 420 is further wrapped with a film.

The cold storage tool 400 may be attached to a fixing jig for fixing an object to be kept cold and may be fixed to the object to be kept cold. Examples of the fixing jig include a supporter, a towel, and a bandage.

The cold storage tool 400 of the third embodiment can be used also for cooling greengrocery and refrigerated products and also for cooling medicine as in the cold storage tool 100 of the second embodiment.

Method for Manufacturing Cold Storage Tool

Figure 12:
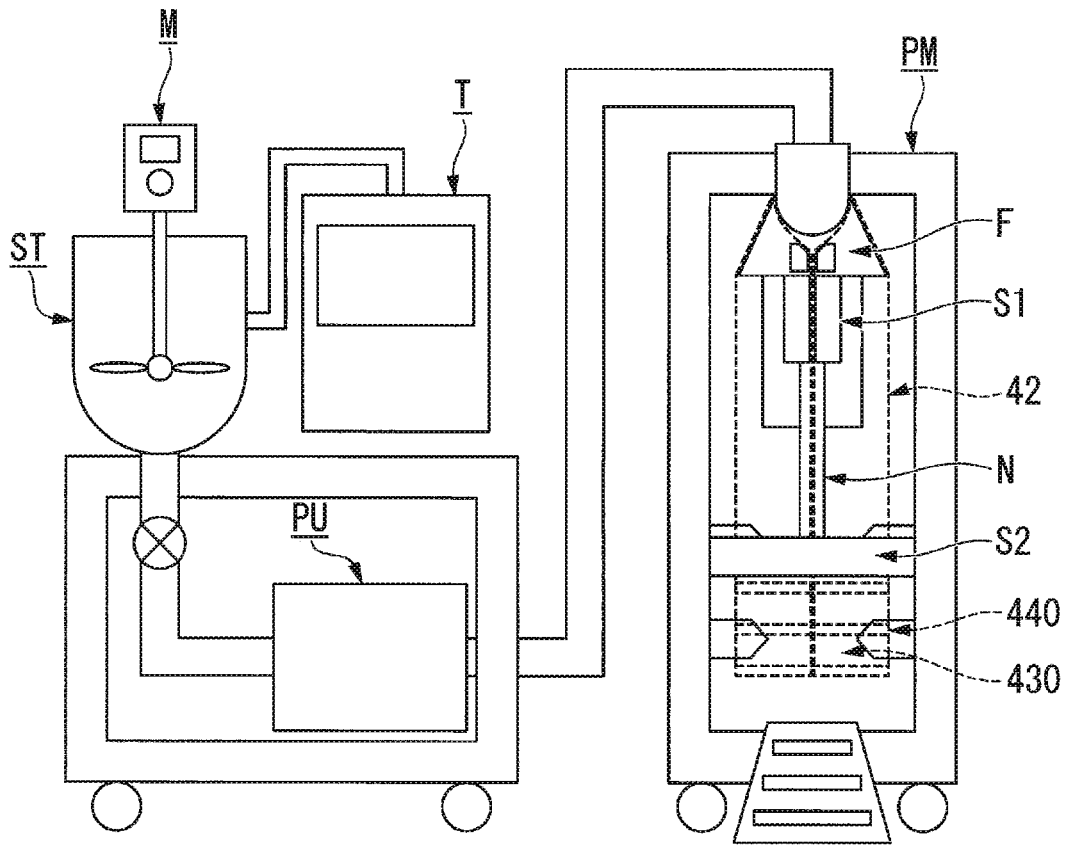
FIG. 12 is a diagram illustrating a schematic configuration of an apparatus that is used for manufacturing the cold storage tool 400 of the third embodiment.

An example of the method for manufacturing the cold storage tool 400 of the present embodiment will be described. FIG. 12 is a diagram illustrating a schematic configuration of an apparatus that is used for manufacturing a cold storage tool 400 according to the third embodiment. The manufacturing apparatus shown in FIG. 12 is a so-called vertical pillow packing machine, which is used for packing foods.

First, a latent heat storage material 150 stored in a thermostat T is transported to a stirring tank ST and is stirred using a stirrer M. Secondly, a rolled film (not shown) is fed out, and both ends of the film 42 in the long axis direction are aligned with each other in the former portion F of the packing machine PM. Then, the both ends are attached to form a tubular shape by thermocompression bonding by a vertical sealing part S1. Then, the short axis direction of the tubular film 42 is thermocompression-bonded by a horizontal sealing part S2. Then, the pump PU is operated to inject the latent heat storage material 150 into the tubular film 42 through a nozzle N, and the short axis direction of the tubular film 42 is then thermocompression-bonded again by the horizontal sealing part S2 to form a joint 440 and an accommodation portion 430. Consequently, a cold storage tool 400 can be manufactured.

Logistic Packaging Container

A logistic packaging container using the cold storage tool 400 of the third embodiment will now be described based on FIG. 13.

Figure 13:
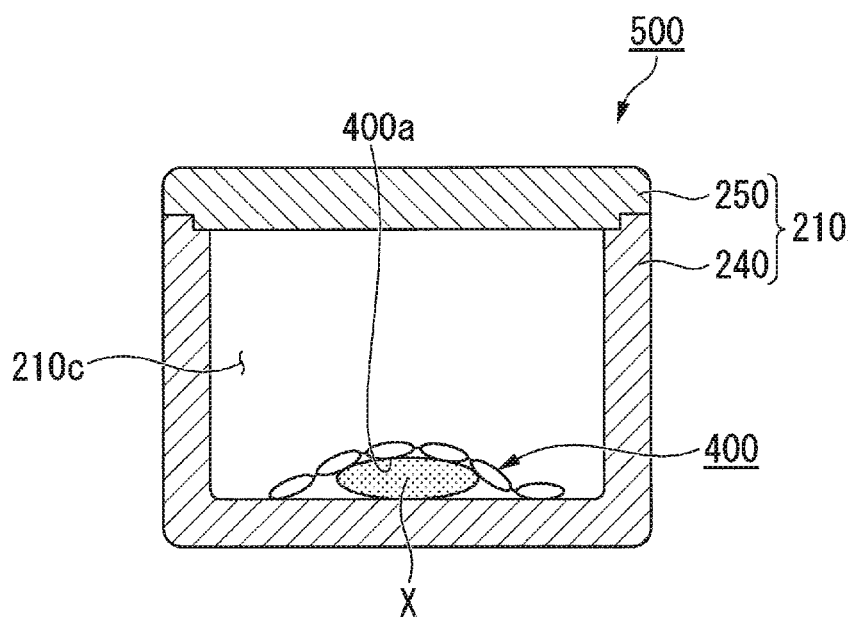
FIG. 13 is a cross-sectional view showing a logistic packaging container 500 of the third embodiment.

FIG. 13 is a cross-sectional view showing a logistic packaging container 500 of the third embodiment. As shown in FIG. 13, the logistic packaging container 500 includes a logistic packaging container body 210 and a cold storage tool 400. Accordingly, components in the present embodiment common to those in the second embodiment are designated by the same reference numerals, and detailed description thereof will be omitted.

The logistic packaging container 500 covers an object X to be kept cold from the top using the cold storage tool 400. Consequently, the logistic packaging container 500 can bring at least a part of the cold storage tool 400 into contact with the object X to be kept cold in the inside of the logistic packaging container body 210. It is inferred that, on this occasion, thermal conduction occurs in the contact surfaces 400a of the object X to be kept cold and the cold storage tool 400 to cool down the object X to be kept cold. In this case, there is almost no influence by heat inflow from the outside into the logistic packaging container 500. Accordingly, the logistic packaging container 500 can efficiently cool the object X to be kept cold.

In contrast, as in the logistic packaging container 200 (see FIG. 6) of the second embodiment, when an object to be kept cold is cooled in a state in which the object to be kept cold and the cold storage tool are separated from each other, the cold storage temperature of the object to be kept cold is higher than the melting start temperature of the latent heat storage material provided to the cold storage tool due to heat exchange with the air present in the interior space of the logistic packaging container body. Accordingly, as the latent heat storage material, a material having a melting start temperature that is lower than the lower limit of the temperature range for maintaining the object to be kept cold is used. However, if such a latent heat storage material is applied to the cold storage tool 400, the temperature of the object to be kept cold may fall below the lower limit of the temperature range to be maintained.

In contrast, in the logistic packaging container 500 of the present embodiment, the melting start temperature of the latent heat storage material of the cold storage tool 400 can be arbitrarily controlled within a range of higher than 0° C. and 28° C. or less by changing the constituent elements of the compound (A) and the inorganic salt (B) and the composition thereof. Accordingly, it is easy to prepare a latent heat storage material having a melting start temperature and a melting point within a temperature range in which the object X to be kept cold should be maintained. That is, the logistic packaging container 500 of the present embodiment can strictly keep the temperature within a range in which an object X to be kept cold should be maintained. Accordingly, the logistic packaging container 500 is suitable for cooling and transporting medicine that requires strict temperature control and for cooling and transporting greengrocery that is apt to cause low temperature damage when the temperature exceeds the lower limit of the temperature range to be maintained.

Incidentally, the logistic packaging container 500 may include a thermal insulation member in the upper portion of the cold storage tool 400 for enhancing the performance of cooling an object X to be kept cold.

It is preferable to appropriately adjust the shape, number, posture in use, and so on of the cold storage tool 400 according to the shape and properties of the object X to be kept cold.

Modification

Figure 14:
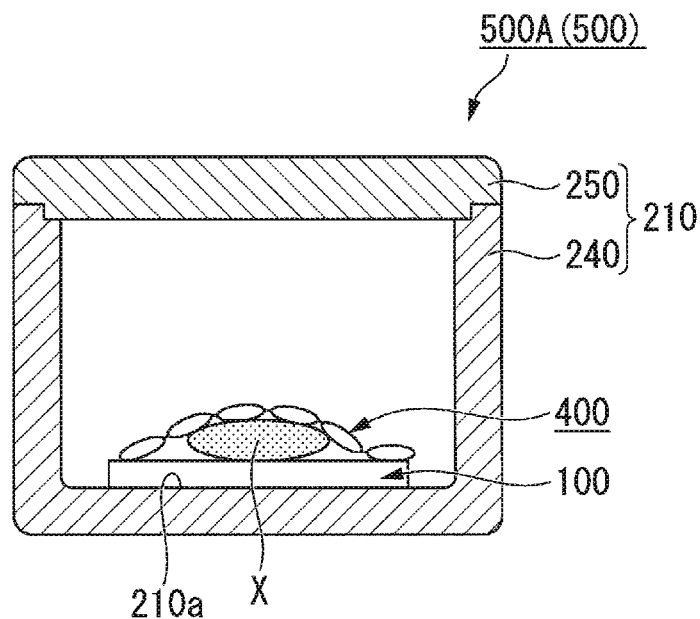
FIG. 14 is a cross-sectional view showing a modification 500A of the logistic packaging container of the third embodiment.

FIG. 14 is a cross-sectional view showing a modification 500A of the logistic packaging container of the third embodiment. The logistic packaging container 500A is different from the logistic packaging container 500 of FIG. 13 in that the logistic packaging container 500A includes a cold storage tool 400 and a cold storage tool 100 (see FIG. 4) of the second embodiment. In the logistic packaging container 500A, the cold storage tool 100 is disposed between an object X to be kept cold and the bottom face 210a inside the logistic packaging container body 210. Consequently, it is possible to prevent heat inflow from the bottom face 210a to the object X to be kept cold.

In addition, as described above, the cold storage tool 100 has little shape change at the phase change of the latent heat storage material from the solid phase to the liquid phase. Accordingly, in the logistic packaging container 500A, an object X to be kept cold can be stably held.

Since the logistic packaging container 500 of the third embodiment includes the above-described cold storage tool 400, it can be used also for cooling greengrocery and refrigerated products and also for cooling medicine.

Cooling Method

A method for using the logistic packaging container 500 of the third embodiment will be described with reference to FIGS. 15 to 19.

Figure 15:
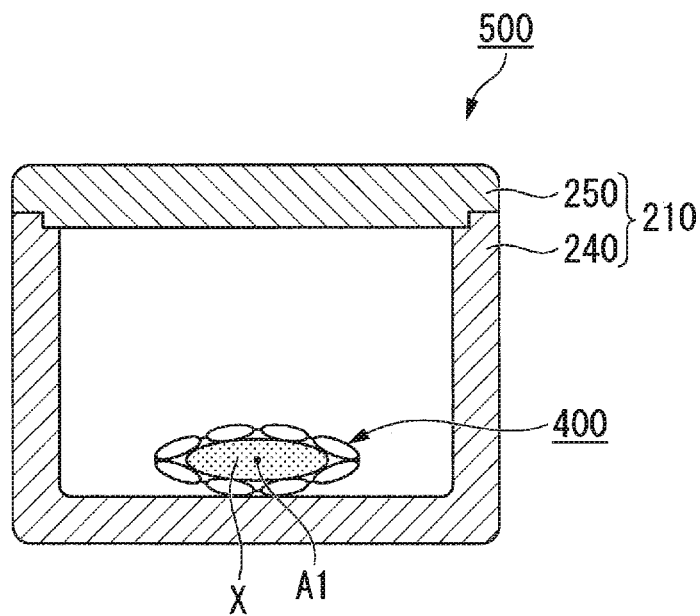
FIG. 15 is a conceptual diagram illustrating a method for using the logistic packaging container 500 of the third embodiment.

FIG. 15 is a conceptual diagram illustrating a method for using the logistic packaging container 500 of the third embodiment. Here, an axis A1 that penetrates the object X to be kept cold is assumed. In the logistic packaging container 500, the object X to be kept cold may be surrounded by the cold storage tool 400 along a circumferential direction of the axis A1. Consequently, the object X to be kept cold can be cooled from the bottom face side and also the side face side inside the logistic packaging container body 210.

Figure 16:
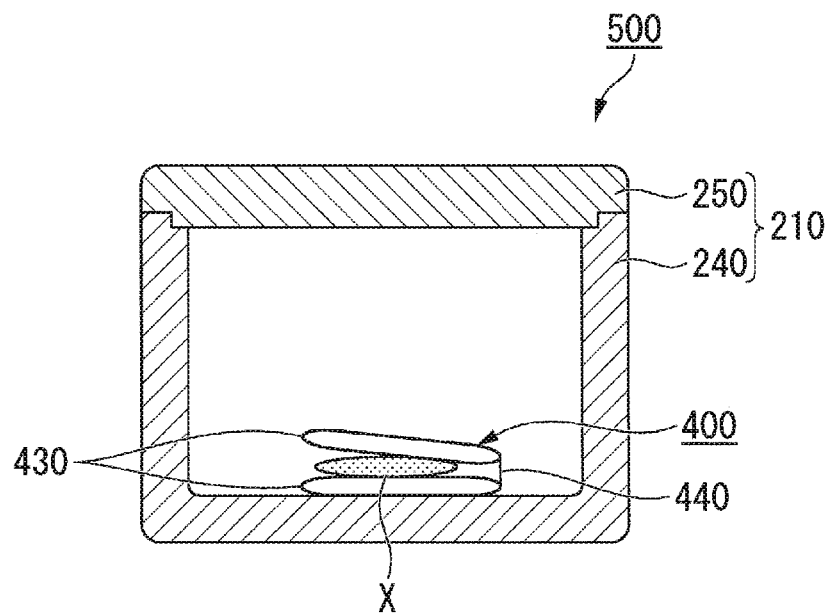
FIG. 16 is a conceptual diagram illustrating a method for using the logistic packaging container 500 of the third embodiment.

FIG. 16 is a conceptual diagram illustrating a method for using the logistic packaging container 500 of the third embodiment. FIG. 16 shows a logistic packaging container 500 including a cold storage tool 400 composed of two accommodation portions 430 and one joint 440. The two accommodation portions 430 may sandwich an object X to be kept cold from the upper and lower directions in the inside of the logistic packaging container body 210. For example, when a sample such as cells is stored, the sample may be placed in a container having a small thickness, such as a dish. It can be said that the method for using the logistic packaging container 500 shown in FIG. 16 is suitable for cooling an object to be kept cold in such a shape.

Figure 17:
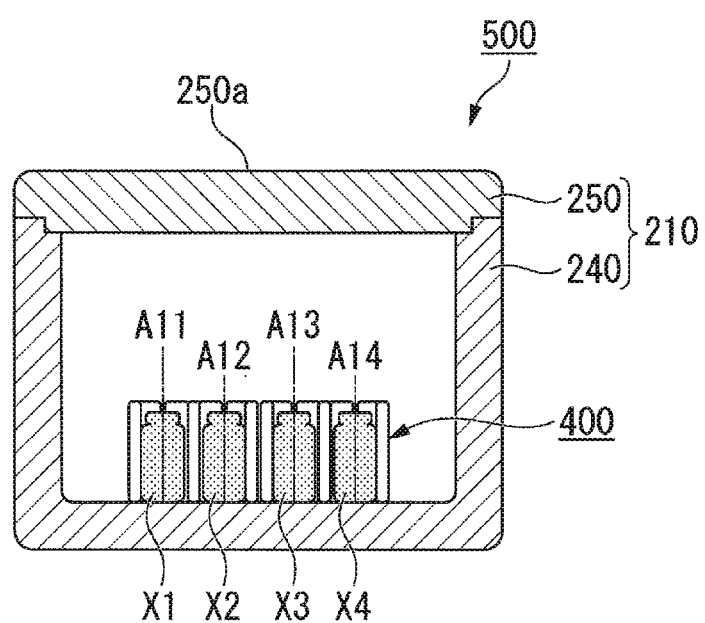
FIG. 17 is a conceptual diagram illustrating a method for using the logistic packaging container 500 when a beverage can is cooled as the object X to be kept cold.
Figure 18:
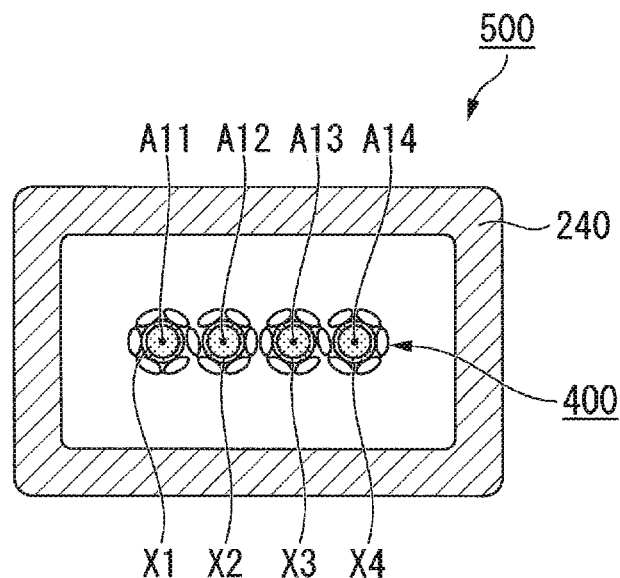
FIG. 18 is a top view in the field viewed from the top surface 250a side of the lid portion 250 shown in FIG. 17.

FIG. 17 is a conceptual diagram illustrating a method for using the logistic packaging container 500 when a tubular article, for example, medicine such as a specimen and a vaccine or a beverage can, is cooled as an object X to be kept cold. FIG. 18 is a top view in the field viewed from the top surface 250a side of the lid portion 250 of FIG. 17. However, FIG. 18 briefly illustrates the lid portion 250.

FIG. 17 shows a logistic packaging container 500 including four cold storage tools 400. Here, axes A11 to A14 that respectively penetrate the four objects X1 to X4 to be kept cold are assumed. In the logistic packaging container 500, the four objects X1 to X4 to be kept cold may be surrounded by four cold storage tools 400, respectively, along circumferential directions of the axes A11 to A14. Consequently, the object X to be kept cold can be cooled from the side face side inside the logistic packaging container body 210.

Figure 19:
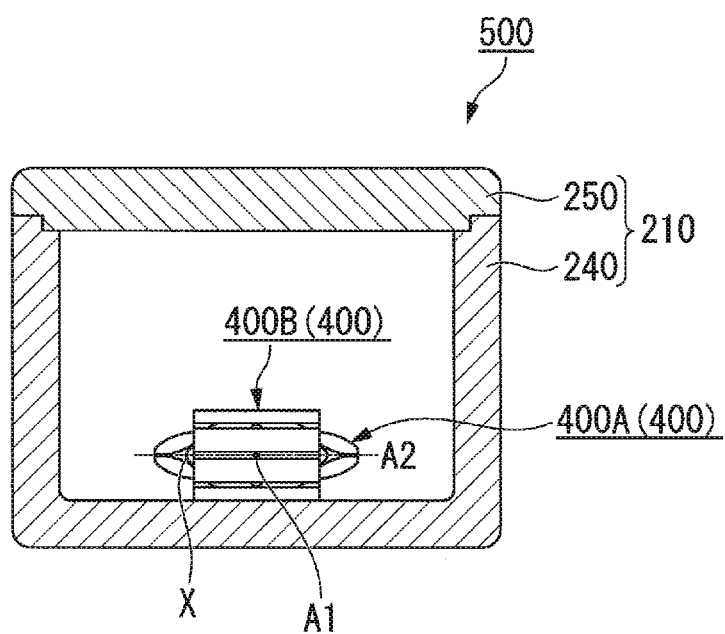
FIG. 19 is a conceptual diagram illustrating a method for using the logistic packaging container 500 of the third embodiment.

FIG. 19 is a conceptual diagram illustrating a method for using the logistic packaging container 500 of the third embodiment. FIG. 19 shows a logistic packaging container 500 including two cold storage tools 400. Here, axes A1 and A2 that penetrate the object X to be kept cold are assumed. The axis A1 and the axis A2 cross each other. In the logistic packaging container 500, the object X to be kept cold may be surrounded by each of the two cold storage tools 400 along circumferential directions of the axes A1 and A2. Specifically, the object X to be kept cold is surrounded by one cold storage tool 400A along a circumferential direction of the axis A1 and is surrounded by the other cold storage tool 400B along a circumferential direction of the axis A2. Consequently, it is possible to prevent heat inflow from the air in the vicinity of the object X to be kept cold. Accordingly, in the using method shown in FIG. 19, the cold insulation performance is high compared to a method by surrounding the object X to be kept cold with the cold storage tool 400 along a circumferential direction of the axis A1 only. In addition, the object X to be kept cold can be maintained at a temperature extremely close to the melting point of the latent heat storage material of the cold storage tool 400.

Fourth Embodiment

Cold Storage Tool

A cold storage tool using the above-described latent heat storage material will now be described based on FIGS. 20 and 21.

Figure 20:
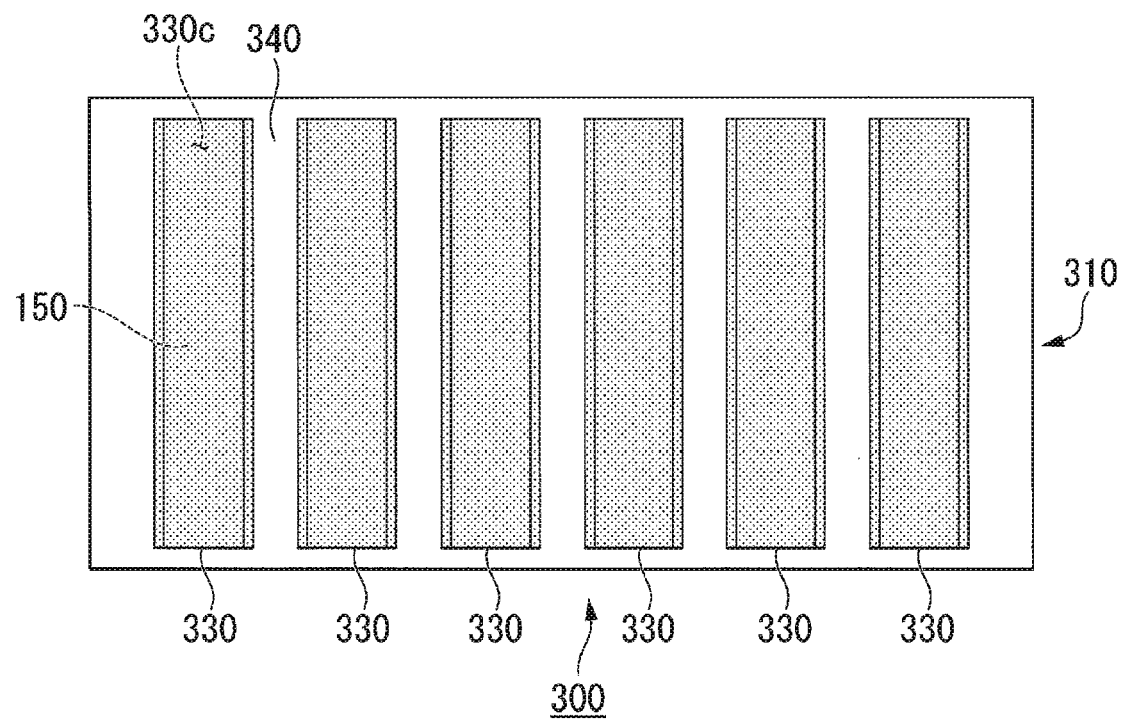
FIG. 20 is a plan view showing a cold storage tool 300 of a fourth embodiment.

FIG. 20 is a plan view showing a cold storage tool 300 according to a fourth embodiment. FIG. 21 is a cross-sectional view of FIG. 20. As shown in FIGS. 20 and 21, the cold storage tool 300 of the present embodiment includes a latent heat storage material 150 and a cold storage tool body 310. The cold storage tool 300 is a so-called blister pack type cold storage tool. Accordingly, components in the present embodiment common to those in the second embodiment are designated by the same reference numerals, and detailed description thereof will be omitted.

The cold storage tool body 310 includes a plurality of accommodation portions 330 and a plurality of joints 340.

The accommodation member 320 accommodates the latent heat storage material 150 in each interior space 330c in a liquid-tight state.

The accommodation member 320 is formed in a strip form. In FIG. 21, although the accommodation portions 330 each have a cross-section in an elliptical contour shape, the cross-section may be another shape.

Figure 21:
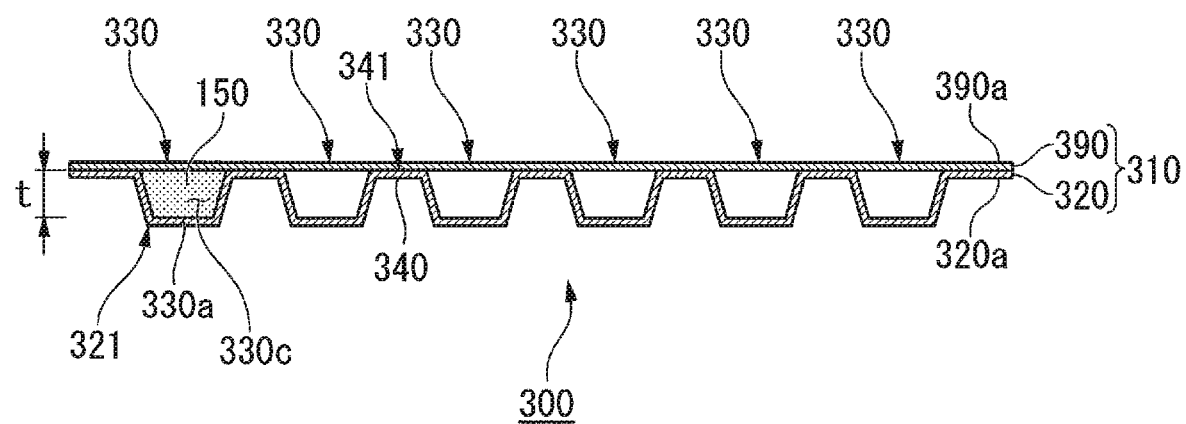
FIG. 21 is a cross-sectional view of a cold storage tool 300 of a fourth embodiment.

Incidentally, although the number of the accommodation portions 330 in FIGS. 20 and 21 is six, the number is not limited thereto. The size of the cold storage tool 300 can be changed according to the size of an object to be kept cold by changing the number of the accommodation portions 330.

In addition, the plurality of accommodation portions 330 may accommodate one kind of latent heat storage material 150 or may accommodate different latent heat storage materials 150 formed by two or more kinds of latent heat storage materials having different melting start temperatures. A plurality of objects to be kept cold having different storage temperatures can be simultaneously cooled by using such a cold storage tool 300.

In order to increase the area in contact with a beverage can, the contact surface 330a of the accommodation portion 330 may be formed in a concave face. In addition, in order to fit the cold storage tool 300 to, for example, a wine bottle, the thickness t of the accommodation portion 330 may change in the longitudinal direction of the accommodation portion 330.

The joint 340 connects two accommodation portions 330 with each other and also has a joint function. The cold storage tool 300 has a plurality of joints 340 and thereby can come into contact with an object to be kept cold in a posture along the shape of the object to be cooled (object to be kept cold) even if the latent heat storage material 150 is in a solid phase state. Accordingly, even if the object to be kept cold has a complicated shape, the cold storage tool 300 can effectively cool down the object to be cooled.

As shown in FIG. 21, the cold storage tool body 310 is constituted of an accommodation member 320 and a sealing member 390. The accommodation member 320 and the sealing member 390 are joined to each other with a plurality of joining portions 341. The region where the accommodation member 320 and the sealing member 390 overlap with the joining portion 341 in a planar view functions as the joint 340. The region where the accommodation member 320 and the sealing member 390 not overlap with the plurality of joining portions 341 in a planar view functions as the accommodation portion 330.

The accommodation member 320 includes a plurality of concaves 321. The plurality of concaves 321, together with the sealing member 390, constitute the plurality of accommodation portions 330. The accommodation member 320 is preferably formed by a material having a hardness capable of retaining the shape of the concave 321.

The sealing member 390 is formed in a planar shape.

The accommodation member 320 and the sealing member 390 are each preferably formed by a material that can prevent leakage and volatilization of the latent heat storage material 150. Furthermore, the accommodation member 320 and the sealing member 390 are each preferably formed by a material having softness that imparts a joint function to the joint 340. Furthermore, the accommodation member 320 and the sealing member 390 are preferably formed by materials that can be bonded to each other in the manufacturing method described later.

The material for forming the accommodation member 320 is preferably, for example, polyethylene, polypropylene, polyamide, polyester, polycarbonate, or polyvinyl chloride. The thickness of the accommodation member 320 is preferably, for example, 100 μm or more and 1000 μm or less. When the thickness of the accommodation member 320 is within the above-mentioned range, the accommodation member 320 has flexibility. As a result, it is possible to impart a joint function to the joint 340.

The material for forming the sealing member 390 is preferably, for example, polyethylene, polypropylene, polyamide, or polyester. The thickness of the sealing member 390 is preferably 50 μm or more and 100 μm or less. When the thickness of the sealing member 390 is within the above-mentioned range, the sealing member 390 has flexibility. As a result, it is possible to impart a joint function to the joint 340.

The accommodation member 320 and the sealing member 390 may be each formed by a single material or an arbitrary combination of two or more materials. In addition, the accommodation member 320 and the sealing member 390 may be each constituted of a single layer or multiple layers.

The accommodation member 320 and the sealing member 390 are each preferably constituted of a multilayer film composed of a linear low-density polyethylene resin layer and a polyamide resin layer. In this case, the joint 340 can be formed by stacking two multilayer films such that the low-density polyethylene resin layers face each other and thermocompression-bonding the contact surfaces of the low-density polyethylene resin layers to each other.

At least one of the accommodation member 320 and the sealing member 290 preferably includes a thin film of aluminum or silicon dioxide in order to enhance the durability and the barrier property. Furthermore, it is preferable to attach a sticker of a temperature indicating material to at least one of the accommodation member 320 and the sealing member 390 because the temperature of the cold storage tool 300 can be judged.

The accommodation member 320 and the sealing member 390 may include a fixing portion. Consequently, the cold storage tool 300 can be arranged so as to surround an object to be kept cold. As the fixing portion, for example, a hook-and-loop fastener constituted of the surface 320a of the accommodation member 320 and the surface 390a of the sealing member 390 can be used.

Modification

Figure 22:
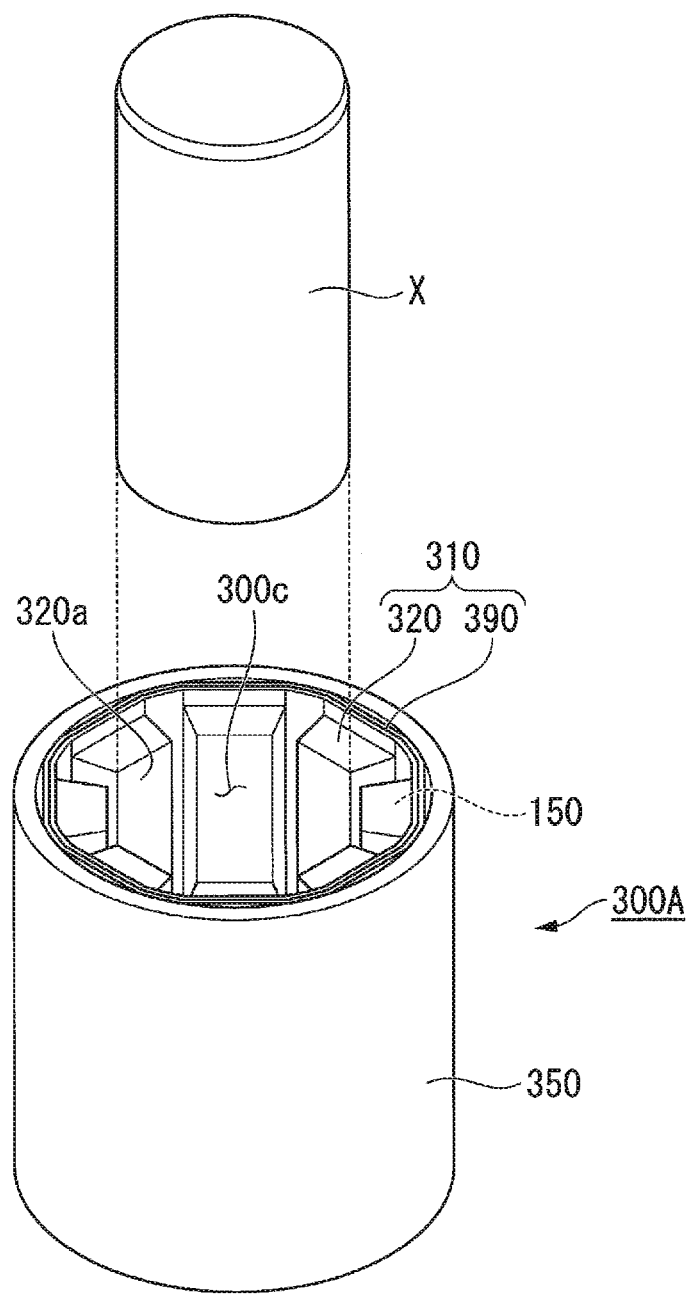
FIG. 22 is a perspective view showing a modification 300A of the cold storage tool of the fourth embodiment.

FIG. 22 is a perspective view showing a modification 300A of a cold storage tool according to the fourth embodiment. The cold storage tool 300A is different from the cold storage tool 300 of FIG. 20 in that the cold storage tool 300A includes a cold storage tool support 350.

The cold storage tool support 350 has a substantially cylindrical shape, and one end of the cylindrical shape is open. The cold storage tool support 350 has a space for accommodating the latent heat storage material 150 and he cold storage tool body 310 in the inside thereof. The cold storage tool body 310 is deformed into a substantially cylindrical shape with the accommodation member 320 inside and the sealing member 390 outside. The cold storage tool 300 is provided with the cold storage tool support 350, and thereby the cold storage tool 300 can stand by itself in a substantially cylindrical shape.

The cold storage tool support 350 is preferably formed by a material that has a heat insulating property and prevents heat exchange with the outside air. Examples of such a material include polyethylene foam, urethane foam, and chloroprene rubber (foam rubber).

Cooling Method

Figure 23:
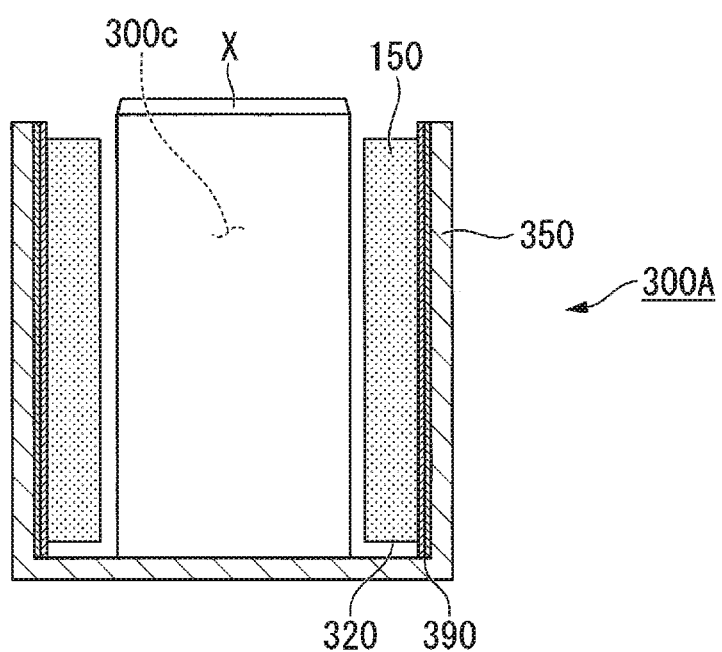
FIG. 23 is a conceptual diagram illustrating a method for using the cold storage tool 300A of the fourth embodiment.

FIG. 23 is a conceptual diagram illustrating a method for using the cold storage tool 300A of the fourth embodiment. As shown in FIG. 23, in the cooling method using the cold storage tool 300A of the fourth embodiment, an object X to be kept cold, such as a beverage can and a beverage bottle, is put in the substantially cylindrical space 300c of the cold storage tool 300A. Consequently, the object X to be kept cold and the cold storage tool 300A are brought near or into contact with each other. As a result, it is possible to maintain the object X to be kept cold at a temperature near the melting start temperature of the latent heat storage material 150 of the cold storage tool 300A.

In this case, it is preferable to form at least a part of the cold storage tool support 350 by a material having elasticity for giving a certain range to the diameter of the object X to be kept cold. The object X to be kept cold and the cold storage tool 300A come into contact with each other due to the elastic force of the cold storage tool support 350.

Method for Manufacturing Cold Storage Tool

Figure 24:
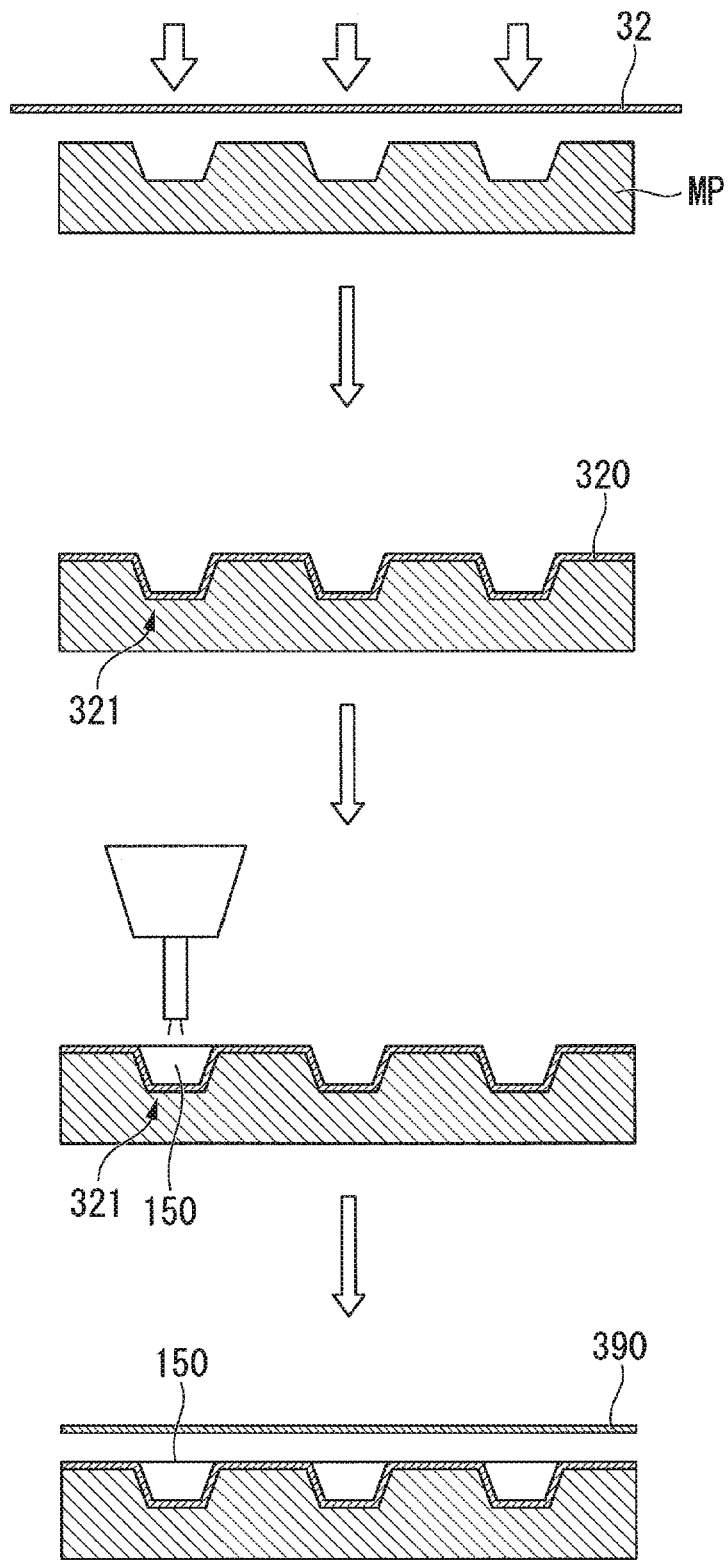
FIG. 24 is a conceptual diagram illustrating a process of manufacturing the cold storage tool 300 of the fourth embodiment.

An example of a method for manufacturing the cold storage tool 300 of the present embodiment will be described. FIG. 24 is a conceptual diagram illustrating a process of manufacturing the cold storage tool 300 of the fourth embodiment. Incidentally, FIG. 21 and FIG. 24 differ from each other in the number of the accommodation portions 330.

First, a rigid film 32, which is a raw material of an accommodation member 320, is placed in a mold MP having a groove of which the cross-sectional contour shape is a trapezoid and is molded into an accommodation member 320 by vacuum molding or pressing. Secondly, a certain amount of a latent heat storage material 150 in the liquid phase state is injected into the concave 321 of the accommodation member 320 using a pump or the like. Then, a sealing member 390 is disposed on the accommodation member 320, and the contact surfaces of the accommodation member 320 and the sealing member 390 are thermocompression-bonded to each other to form an accommodation portion 330 and a joint 340.

Logistic Packaging Container

A logistic packaging container using the cold storage tool 300 of the fourth embodiment will now be described based on FIG. 25.

Figure 25:
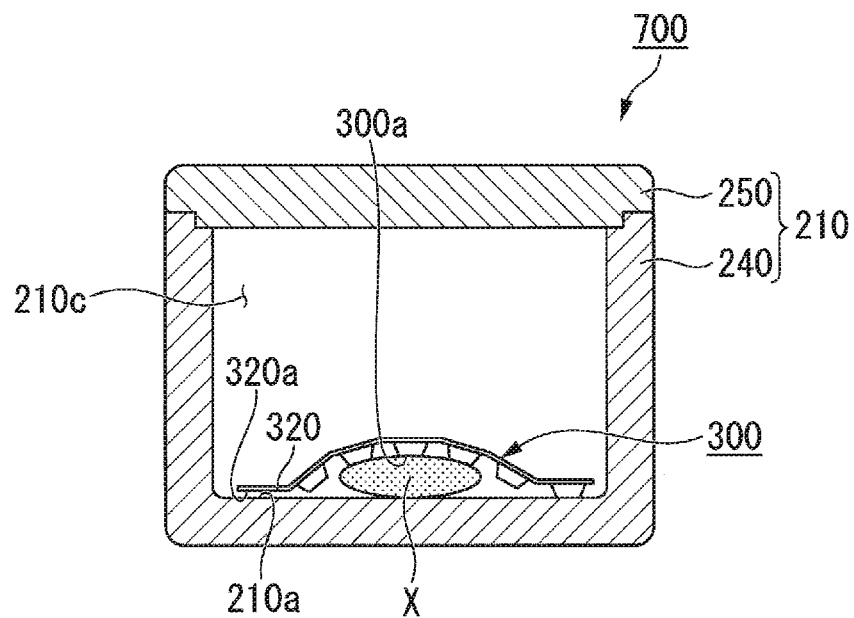
FIG. 25 is a cross-sectional view of a logistic packaging container 700 of the fourth embodiment.

FIG. 25 is a cross-sectional view of a logistic packaging container 700 according to the fourth embodiment. The logistic packaging container 700 includes a logistic packaging container body 210 and a cold storage tool 300. Accordingly, components in the present embodiment common to those in the second embodiment are designated by the same reference numerals, and detailed description thereof will be omitted.

The logistic packaging container 700 covers an object X to be kept cold from the top using the cold storage tool 300. Consequently, the logistic packaging container 700 can bring at least a part of the cold storage tool 300 into contact with the object X to be kept cold in the inside of the logistic packaging container body 210. It is inferred that thermal conduction occurs in the contact surfaces 300a of the object X to be kept cold and the cold storage tool 300 to cool down the object X to be kept cold. In this case, there is almost no influence by heat inflow from the outside into the logistic packaging container 700. Accordingly, the logistic packaging container 700 can efficiently cool the object X to be kept cold.

In addition, in the logistic packaging container 700 of the present embodiment, the melting start temperature of the latent heat storage material of the cold storage tool 300 can be arbitrarily controlled within a range of higher than 0° C. and 28° C. or less by changing the constituent elements of the compound (A) and the inorganic salt (B) and the composition thereof. Accordingly, a latent heat storage material having a melting start temperature and a melting point can be easily adjusted within the temperature range in which the object X to be kept cold should be maintained. That is, the logistic packaging container 700 of the present embodiment can strictly cool an object X to be kept cold within a temperature range in which the object should be maintained. Accordingly, the logistic packaging container 700 is suitable for cooling and transporting medicine that requires strict temperature control and for cooling and transporting greengrocery that is apt to cause low temperature damage when the temperature exceeds the lower limit of the temperature range to be maintained.

In the logistic packaging container 700 of the present embodiment, the surface 320a of the accommodation member 320 and the surface 210a of the logistic packaging container body 210 can be fixed with, for example, a hook-and-loop fastener.

Incidentally, the logistic packaging container 700 may include a thermal insulation member in the upper portion of the cold storage tool 300 for enhancing the performance of cooling an object X to be kept cold.

Since the logistic packaging container 700 of the fourth embodiment includes the above-described cold storage tool 300, it can be used also for cooling greengrocery and refrigerated products and also for cooling medicine.

Fifth Embodiment

Food Cold Storage Tool

A food cold storage tool using the above-described latent heat storage material will now be described based on FIG. 26.

Figure 26:
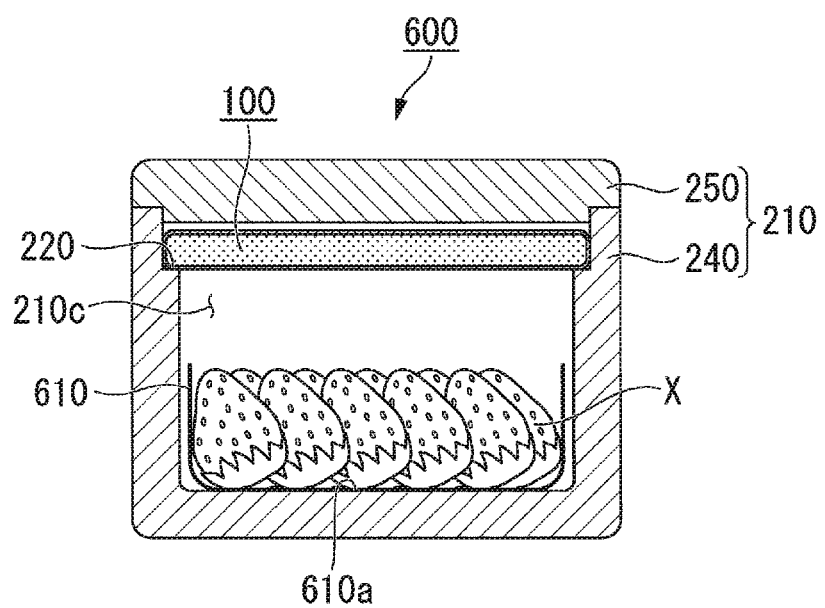
FIG. 26 is a conceptual diagram illustrating a method for using a food cold storage tool 600 of a fifth embodiment.

FIG. 26 is a conceptual diagram illustrating a method for using a food cold storage tool 600 of a fifth embodiment. The food cold storage tool 600 includes a logistic packaging container body 210, a cold storage tool 100, and inner container 610. Accordingly, components in the present embodiment common to those in the second embodiment are designated by the same reference numerals, and detailed description thereof will be omitted.

The inner container 610 holds food. In the food cold storage tool 600, fresh food, such as meat and fish, and greengrocery, such as vegetables and fruits, accommodated in the logistic packaging container body 210 can be prevented from coming into direct contact with each other by the inner container 610. Consequently, it is possible to suppress secondary contamination by food poisoning bacteria. The surface 610a of the inner container 610 is preferably coated by an antibacterial agent or the like.

Since the food cold storage tool 600 of the fifth embodiment includes the above-described cold storage tool 100, it can be used also for cooling greengrocery and refrigerated products and also for cooling medicine.

Although preferred embodiments according to the present invention have been described above with reference to the accompanying drawings, the present invention is not limited these examples. The shapes and combinations of the constituent members shown in the above-described examples are merely examples, and various modifications can be made based on design requirements and so on without departing from the gist of the present invention.

For example, the logistic packaging container 200 of the second embodiment may also use the cold storage tool 300 of the fourth embodiment or the cold storage tool 400 of the third embodiment.

The food cold storage tool 600 of the fifth embodiment may include the cold storage tool 300 of the fourth embodiment or the cold storage tool 400 of the third embodiment as a cold storage tool.

The cold storage tool 400 of the third embodiment may include a cold storage tool support.

EXAMPLES

The present invention will now be described by examples but is not limited to these examples.

Preparation of Latent Heat Storage Material

Example 1

In Example 1, potassium bromide was used as the bromide salt of an alkali metal showing negative hydration. TBAB (2.0 kg) and potassium bromide (0.74 kg) were weighed, and 2.94 kg of pure water was added thereto, followed by stirring with a mechanical stirrer at 600 rpm for 1 hour for complete dissolution. On this occasion, the molar ratio of TBAB and potassium bromide was 1:1, and the molar ratio of water to TBAB was 26.3. Thus, a latent heat storage material of Example 1 was obtained.

Example 2

In Example 2, cesium bromide was used as the bromide salt of an alkali metal showing negative hydration. A latent heat storage material was prepared by the same method as that in Example 1 except that cesium bromide was added at a molar ratio with TBAB of 1:1 in place of potassium bromide in Example 1. Thus, a latent heat storage material of Example 2 was obtained.

Comparative Example 1

In Comparative Example 1, lithium bromide was used as the bromide salt of an alkali metal showing positive hydration. A latent heat storage material was prepared by the same method as that in Example 1 except that lithium bromide was added at a molar ratio with TBAB of 1:1 in place of potassium bromide in Example 1. Thus, a latent heat storage material of Comparative Example 1 was obtained.

Comparative Example 2

In Comparative Example 2, sodium bromide was used as the bromide salt of an alkali metal showing positive hydration. A latent heat storage material was prepared by the same method as that in Example 1 except that sodium bromide was added at a molar ratio with TBAB of 1:1 in place of potassium bromide in Example 1. Thus, a latent heat storage material of Comparative Example 2 was obtained.

Comparative Example 3

In Comparative Example 3, potassium chloride was used as an alkali metal salt showing negative hydration with an anion different from a bromide.

A latent heat storage material was prepared by the same method as that in Example 1 except that potassium chloride was added at a molar ratio with TBAB of 1:1 in place of potassium bromide in Example 1. Thus, a latent heat storage material of Comparative Example 3 was obtained.

Subsequently, about 5 g of each of the resulting latent heat storage materials of Examples 1 and 2 and Comparative Examples 1 to 3 was added to respective glass tube bottles and were frozen in a thermostat with a temperature variable function to −20° C. Subsequently, the temperature in the thermostat was raised from −20° C. to 30° C. at a rate of 0.25° C./min while measuring the temperature inside the latent heat storage material with a thermocouple for evaluation of melting behavior. The results are shown in FIG. 2A.

Figure 2A:
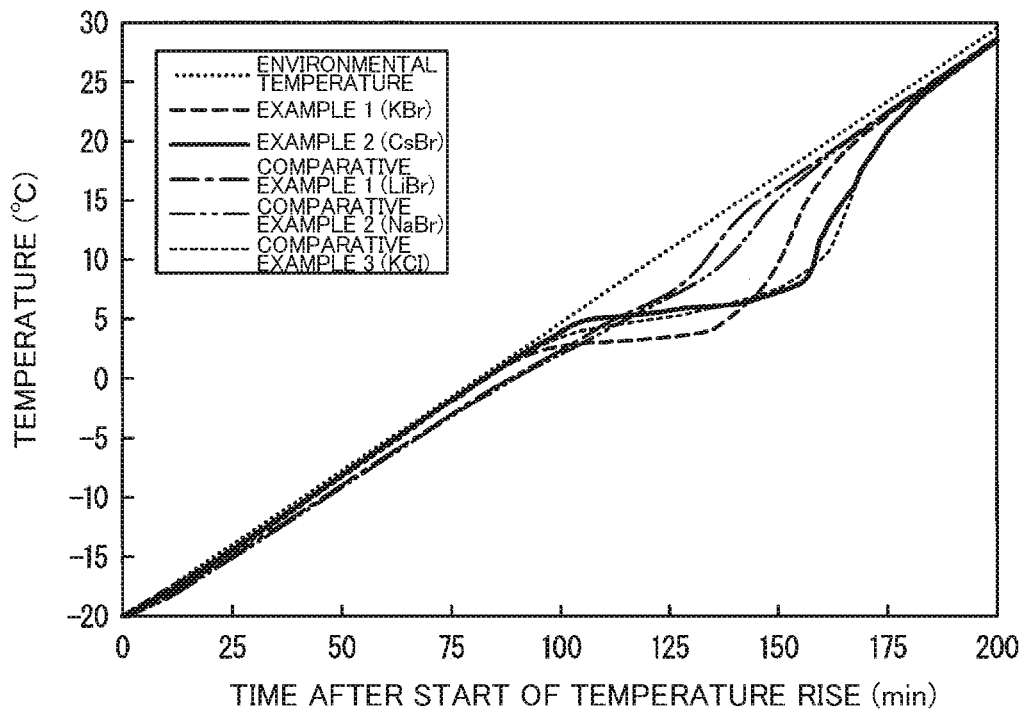
FIG. 2A is a graph showing melting behaviors in examples using different bromide salts of alkali metals.

FIG. 2A shows melting behaviors of bromide salts of various alkali metals. In latent heat storage materials including an alkali metal salt, LiBr or NaBr, showing positive hydration, a constant temperature was not obtained during melting, and the temperature was gradually increased with an increase in the environmental temperature, and a constant temperature was not maintained. That is, it is inferred that when a salt showing positive hydration was used, no stable eutectic crystal of TBAB, an inorganic salt, and water was obtained, and no phase change occurred at a constant temperature. In contrast, when an alkali metal salt, KBr or CsBr, showing negative hydration was used, constant temperatures of 3° C. and 6° C. were maintained, respectively, with an increase in the environmental temperature, and it was shown that they each function as a so-called latent heat storage material.

In addition, a constant temperature other than 3° C. and 6° C. was not observed within a temperature range of −20° C. to 30° C. That is, it was confirmed that the raw materials, TBAB, KBr or CsBr, and water, constituting the latent heat storage material of this example and eutectic crystals constituted of two molecules of the raw materials did not function as a latent heat storage material. This also demonstrates that a latent heat storage material having a melting point of 3° C. is obtained by eutectic crystallization of TBAB, KBr, and water, and a latent heat storage material having a melting point of 6° C. is obtained by eutectic crystallization of TBAB, CsBr, and water.

In addition, in Comparative Example 3, it was demonstrated that the temperature was maintained at 4° C. to 7° C. to a certain extent with an increase in the environmental temperature but gradually increased within this temperature range. In contrast, in Examples 1 and 2, it was demonstrated that constant temperatures of 3° C. and 6° C. were maintained.

In the present invention, the alkali metal anion showing negative hydration is the anion of the same element of the anion of the compound (A), but in Comparative Example 3, the alkali metal anion is of a different element. When the alkali metal anion is of a different element, there is a risk of ion exchange between the anion (Br⁻) of the compound (A) and the anion (Cl⁻) of the inorganic salt (B), and the crystal system is complicated. It is thought that the difference between the melting start temperature and the end temperature is consequently increased.

In more detail, when TBAB and potassium chloride are added to and dissolved in water, TBAB and potassium chloride are respectively ionized into a TBA cation and a bromide ion and into a potassium ion and a chloride ion. When the solution is subsequently solidified, it is inferred that the generated crystal contains certain amounts of TBAC and potassium bromide generated by ion exchange, in addition to TBAB and potassium chloride. As a result, it is conjectured that the generated crystal contains not only a ternary-system crystal of TBAB, potassium chloride, and water as the raw materials but also TBAC and further clathrate hydrate thereof. Since a crystal constituted of various components has a melting point resulting from the various components, the temperature is gradually increased with an increase in the environmental temperature without maintaining a constant temperature, resulting in an increase in the difference between the melting start temperature and the melting end temperature. In addition, although it also depends on the ratio of TBAB, potassium chloride, water, considering the complication of the crystal due to ion exchange in an aqueous solution, it is difficult in principle to reduce the difference between the melting start temperature and the melting end temperature even if the ratio is adjusted.

In contrast, when the alkali metal anion is of the same element, since ion exchange does not visually occur in an aqueous solution, the eutectic state is simplified, and the difference between the melting start temperature and the melting end temperature can be decreased by appropriately adjusting the ratio of the compound (A), the inorganic salt (B), and water.

Figure 2B:
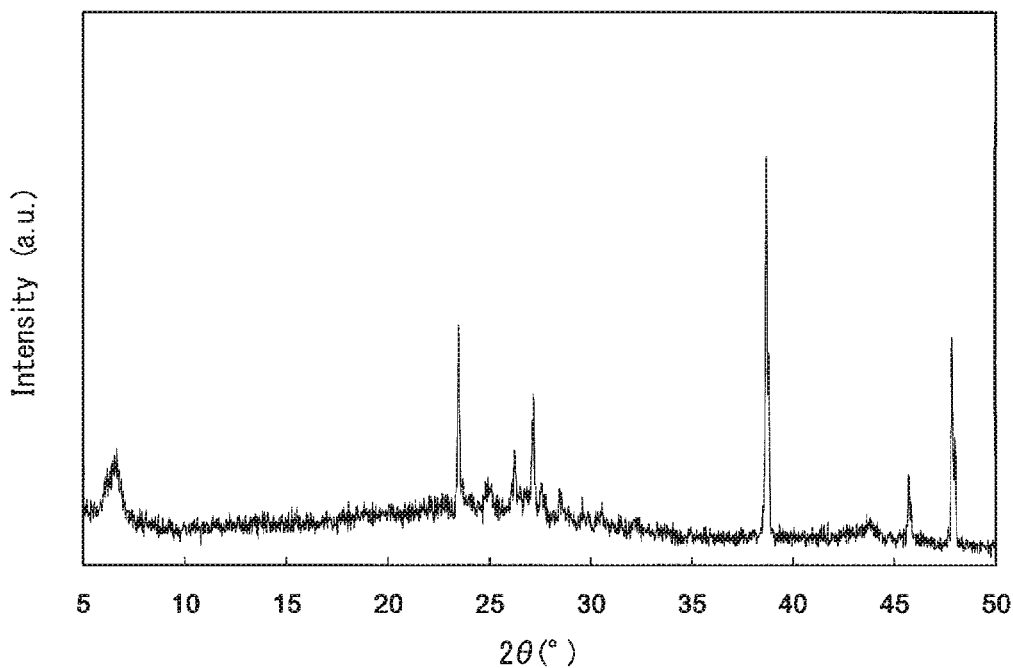
FIG. 2B is a graph showing an X-ray diffraction pattern of the latent heat storage material in a solid phase state of Example 1 among examples.
Figure 2C:
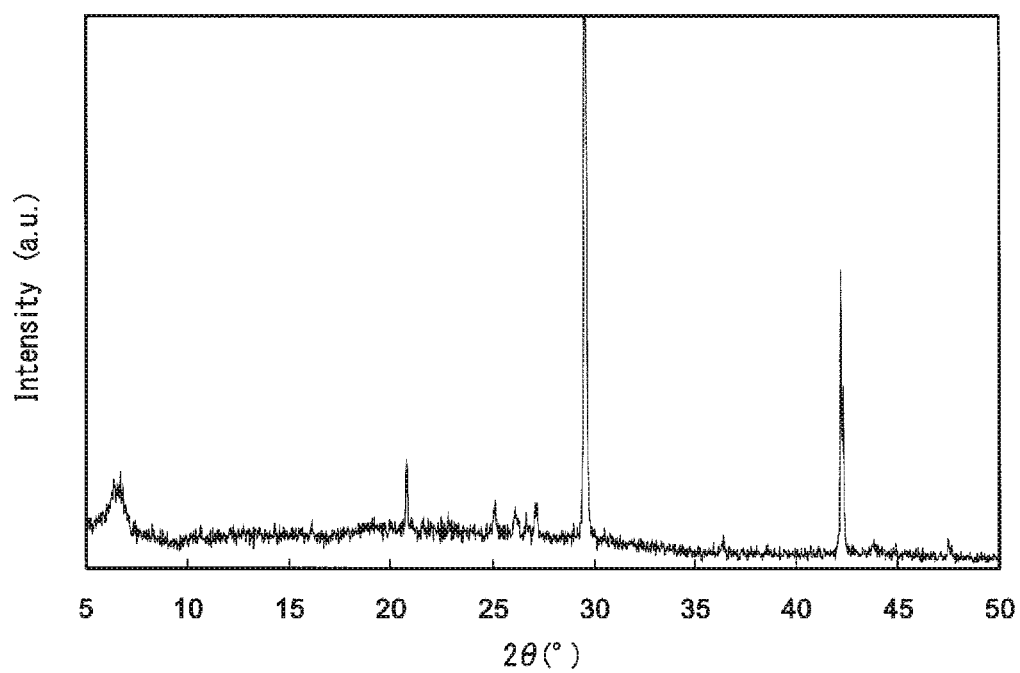
FIG. 2C is a graph showing an X-ray diffraction pattern of the latent heat storage material in a solid phase state of Example 2 among examples.

Furthermore, the results of XRD in the solid phase states in Examples 1 and 2 are shown in FIGS. 2B and 2C, respectively. As shown in FIGS. 2B and 2C, diffraction patterns were observed. In contrast, although it is known that in the diffraction pattern of a hexagonal lattice of ice, a typical peak is observed at a diffraction angle 2θ of 22.7°, 24.1°, or 27.7°, such a peak was not observed in FIGS. 2B and 2C. That is, it is demonstrated that the latent heat storage material of this example in the solid phase state is not a mixture composed of single crystals of simple substances of the compound (A), the inorganic salt (B), and water but has a novel crystal structure and forms a eutectic crystal of TBAB as the compound (A), the inorganic salt (B), and water.

Furthermore, in order to evaluate the latent heat amount and the temperature range during melting, DSC (differential scanning calorimetry) was performed. The results are shown in Table 1.

TABLE 1

|  | Latent heat during melting | | Difference between melting start temperature and end temperature |
| --- | --- | --- | --- |
|  | (J/g) | (J/L) | (° C.) |
| Example 1 | −182 | −204 | 7.9 |
| Example 2 | −163 | −194 | 7.5 |
| Comparative Example 1 | −114 | −125 | 22.3 |
| Comparative Example 2 | −105 | −114 | 23.5 |
| Comparative Example 3 | −182 | −191 | 11.5 |
| TBAB clathrate hydrate | −185 | −194 | 7.2 |

Table 1 shows the latent heat values obtained by DSC in Examples and Comparative Examples and differences between melting start temperature and melting end temperature obtained by DSC as the temperature ranges during melting. As obvious also from Table 1, in Examples 1 and 2, the latent heat value is high, and the difference between the melting start temperature and the end temperature is small.

This also demonstrates that since a eutectic crystal is formed from TBAB, a bromide salt of an alkali metal that shows negative hydration with water, and water by adding a bromide salt of an alkali metal showing negative hydration to a solution having a concentration in which the clathrate hydrate of TBAB gives a congruent melting point, a single melting point is observed.

In addition, comparison between Example 1 and Example 2 demonstrates that the latent heat amount in Example 1 is higher and that it is more preferable to add KBr to a TBAB clathrate hydrate.

Examples 3 to 7

Latent heat storage materials were prepared as in Example 1 except that the molar ratios of potassium bromide and water to TBAB were those shown in Table 2. Furthermore, Table 2 shows the melting start temperatures and the latent heat amounts in Examples 3 to 7. As shown in Table 2, the melting start temperatures were about 3° C. The latent heat amounts of the latent heat storage materials were relatively high values.

TABLE 2

| Example | Molar ratio to TBAB | | Melting start temperature (° C.) | Latent heat amount (J/g) |
| --- | --- | --- | --- | --- |
| | Potassium bromide | Water | | |
| Example 3 | 0.75 | 26.8 | 2.9 | 165 |
| Example 4 | 1 | 25.2 | 3.2 | 188 |
| Example 5 | 1.1 | 25.2 | 3.2 | 184 |
| Example 6 | 1.15 | 25.2 | 3.2 | 185 |
| Example 7 | 1.25 | 25.2 | 3.2 | 186 |

Example 8

In Example 8, potassium chloride was used as the chloride of an alkali metal showing negative hydration. TBAC (2.0 kg) and potassium chloride (0.46 kg) were weighed, and 3.35 kg of pure water was added thereto, followed by stirring with a mechanical stirrer at 600 rpm for 1 hour for complete dissolution. On this occasion, the molar ratio of TBAB and potassium chloride was 1:1, and the molar ratio of water to TBAB was 30. Thus, a latent heat storage material of Example 8 was obtained.

The melting start temperature and the latent heat amount measured by DSC as in Example 1 were 8.6° C. and 185 J/g, respectively. Incidentally, this melting start temperature is different from all of the melting start temperature of −0.5° C. of ice, the melting start temperature of about 15° C. of the clathrate hydrate of TBAC, and the melting start temperature of −11° C. of the eutectic crystal of potassium chloride and water. It is inferred that this is caused by formation of an eutectic crystal of TBAC, potassium chloride, and water.

Example 9

Two blow containers each filled with 1.3 L of the latent heat storage material of Example 1 were prepared as cold storage tools in a logistic packaging container (baggage compartment volume: 7 L, made of styrene foam) shown in FIG. 7. In addition, as Comparative Example 4, two cold storage tools were prepared by similarly filling each of blow containers with 1.3 L of a cold storage material mainly composed of tetradecane and having a melting start temperature of 5° C. These cold storage tools were disposed at the top and the bottom in the logistic packaging container and were subjected to a transportation experiment at an environment temperature of 30° C.

On this occasion, a film pack in which 100 g of water was enclosed was used as an object to be cooled, and the change in temperature of the water through the film pack when the logistic packaging container was left to stand in an atmosphere of 30° C. was traced. Incidentally, for the measurement, Thermoclone, which is a chip type temperature logger, was used.

Figure 27:
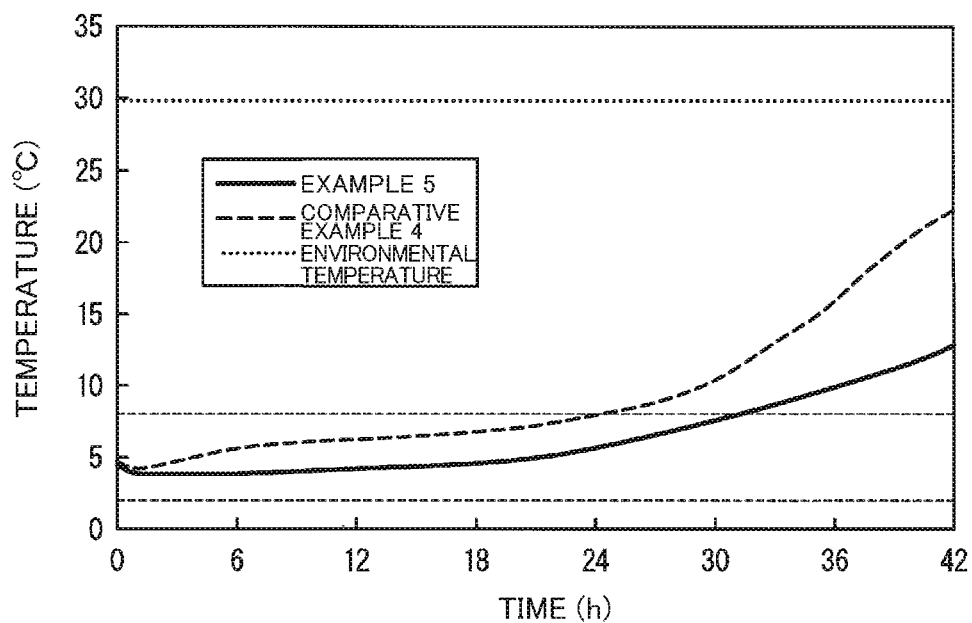
FIG. 27 is a graph showing the results of transportation in Example 9.

FIG. 27 shows the results of the transportation experiment. As obvious also from the graph, the increase in temperature in Example 9 was slow compared to Comparative Example 4. In addition, it was demonstrated that a temperature range of 2° C. to 8° C., which is important for transporting medical-related articles, was maintained for a long time. The latent heat storage material of the present invention has a specific gravity about 1.4 times larger than that of the cold storage material that is, in general, mainly made of paraffin. Accordingly, the latent heat per volume is larger than that of general paraffin, and if the baggage compartment volume is the same, it is possible to cool for a long time.

That is, since the latent heat storage material of the present invention shows a single melting point and has a high latent heat value, it is possible to cool for a long time without departing from the temperature to be held.

Examples 10 to 13

In Examples 10 to 13, latent heat storage materials were prepared using various compounds (A) and inorganic salts (B) at composition ratios shown in Table 3. Furthermore, the melting start temperatures and the latent heat amounts of the resulting latent heat storage materials were measured by the same method as that in Example 1 and were summarized in Table 3.

TABLE 3

| Example | Compound (A) | Compound (B) | Molar ratio to compound (A) | | Melting start temperature (° C.) | Latent heat during melting (J/g) |
| --- | --- | --- | --- | --- | --- | --- |
| | | | Inorganic acid (B) | Water | | |
| Example 10 | TBAB | RbBr | 1.5 | 26.3 | 1.9 | 177 |
| Example 11 | TBAN | KNO$_3$ | 0.2 | 26.5 | 1.3 | 181 |
| Example 12 | TBPB | KBr | 1.5 | 32.0 | −2.9 | 176 |
| Example 13 | TBPAB | KBr | 1.5 | 31.8 | −4.5 | 150 |

Figure 28:
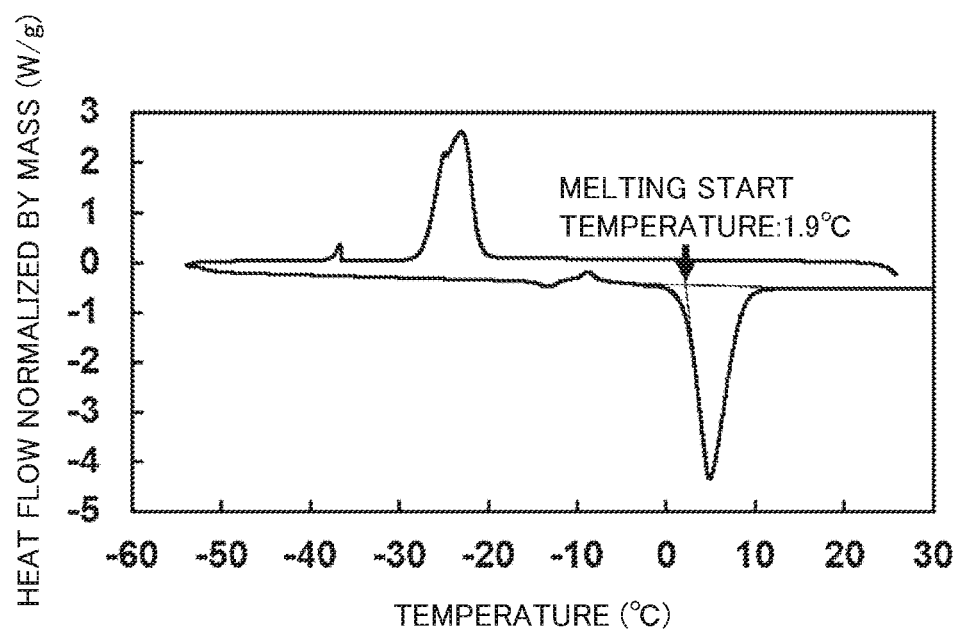
FIG. 28 is a graph showing the results of DSC of a latent heat storage material in Example 10.

In Example 10, TBAB was used as the compound (A), and rubidium bromide including rubidium as the alkali metal showing negative hydration was used as the inorganic salt (B). FIG. 28 shows the result of DSC of the latent heat storage material of this example. As shown in FIG. 28, the melting start temperature was 1.9° C. Thus, the latent heat storage material melted at a temperature different from those of water and the clathrate hydrate of TBAB. It is inferred that this is caused by formation of a eutectic crystal of TBAB, rubidium bromide, and water. As shown by Examples 1 to 3 and this example, a eutectic crystal of a compound (A), an inorganic salt (B), and water is stably formed by using an alkali metal showing negative hydration as the inorganic salt (B).

Figure 29:
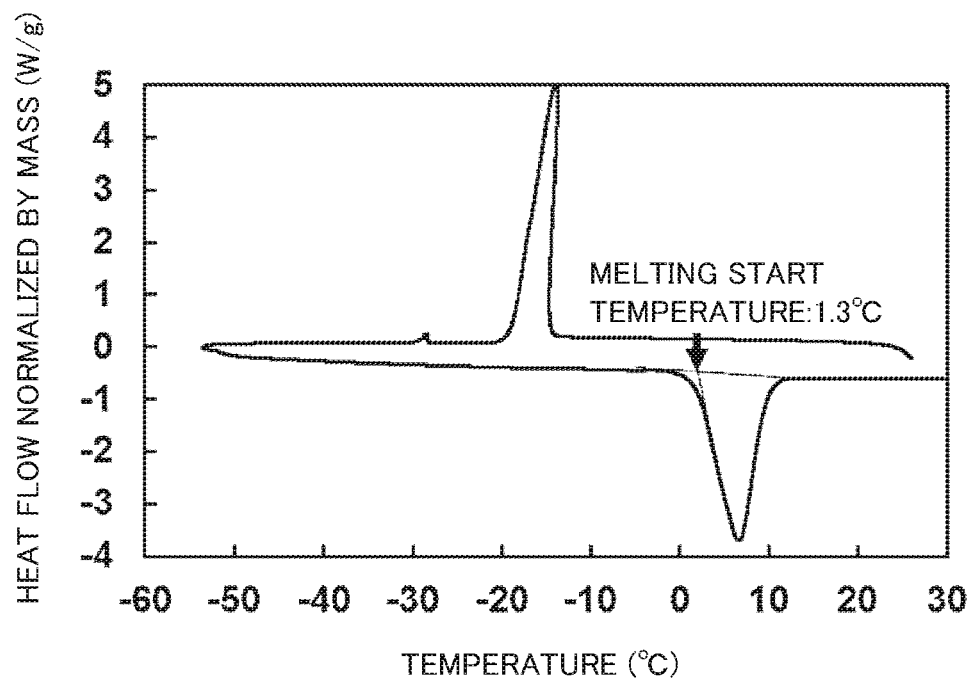
FIG. 29 is a graph showing the results of DSC of a latent heat storage material in Example 11.

In addition, in Example 11, tetrabutylammonium nitrate (TBAN) whose anion species is not a halogen was used as the compound (A), and potassium nitrate was used as the inorganic salt (B). FIG. 29 shows the result of DSC of the latent heat storage material of this example. As shown in FIG. 29, the melting start temperature was 1.3° C. Thus, the latent heat storage material melted at a temperature different from those of water and the clathrate hydrate (melting start temperature: 3.3° C.) of TBAN. That is, it was demonstrated that even if the anion species of the compound (A) is not a halogen, a eutectic crystal of the compound (A), the inorganic salt (B), and water can be obtained by using the same anion species.

Figure 30:
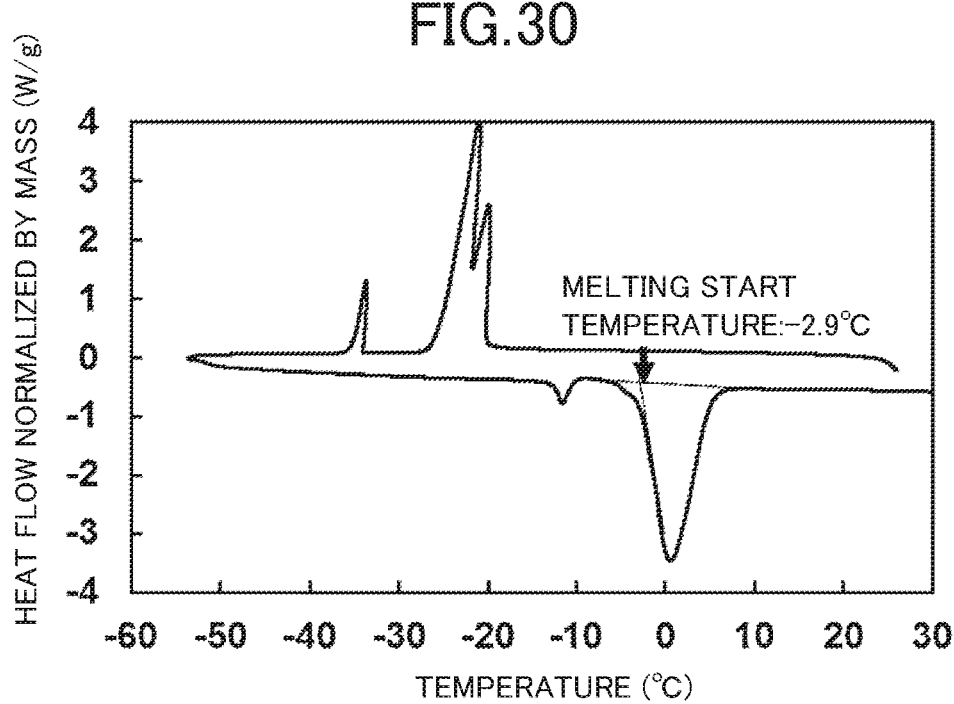
FIG. 30 is a graph showing the results of DSC of a latent heat storage material in Example 12.

In addition, in Example 12, a quaternary phosphonium salt, tetrabutylphosphonium bromide (TBPB), was used as the compound (A), and potassium bromide was used as the inorganic salt (B). FIG. 30 shows the result of DSC of the latent heat storage material of this example. As shown in FIG. 30, the melting start temperature was −2.9° C. Thus, the latent heat storage material melted at a temperature different from those of water and the clathrate hydrate (melting start temperature: 6.6° C.) of TBPB. That is, it was demonstrated that even if the compound (A) is a quaternary phosphonium salt, a eutectic crystal of the compound (A), the inorganic salt (B), and water can be obtained by using a compound that can form a clathrate hydrate.

Figure 31:
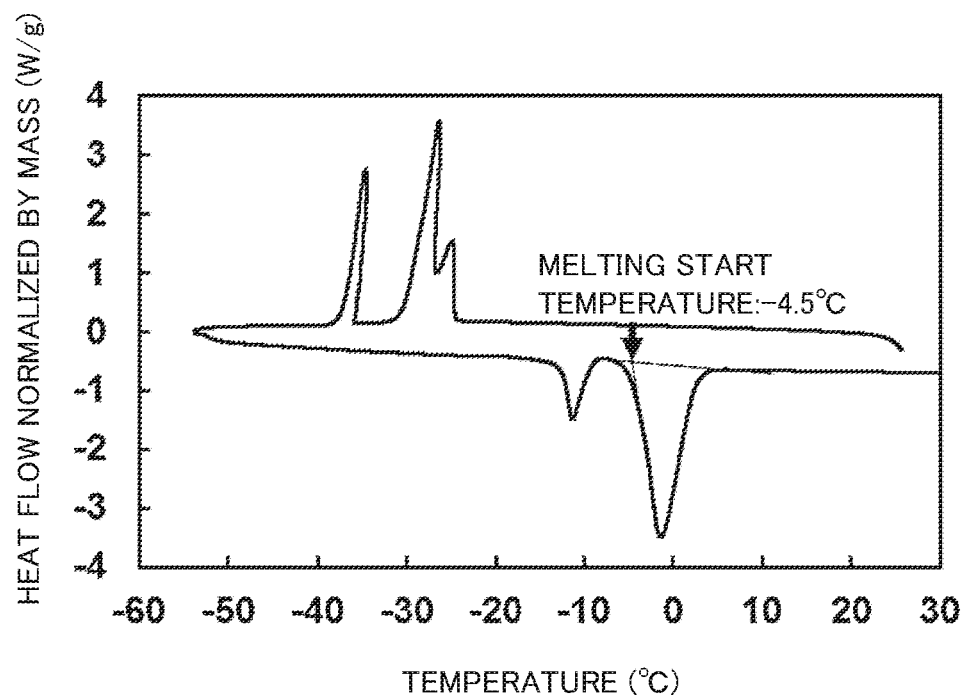
FIG. 31 is a graph showing the results of DSC of a latent heat storage material in Example 13.

In addition, in Example 13, tributylpentylammonium bromide (TBPAB) having an n-pentyl group as the alkyl group of the compound (A) was used as the compound (A), and potassium bromide was used as the inorganic salt (B). FIG. 31 shows the result of DSC of the latent heat storage material of this example. As shown in FIG. 31, the melting start temperature was −4.5° C. Thus, the latent heat storage material melted at a temperature different from those of water and the clathrate hydrate (melting start temperature: 4.3° C.) of TBPAB. That is, it was demonstrated that even if the alkyl group of the compound (A) is a group other than butyl group, a eutectic crystal of the compound (A), the inorganic salt (B), and water can be obtained by using a compound that can form a clathrate hydrate.

As shown in Examples 10 to 13, it was demonstrated that latent heat storage materials having respective melting start temperatures according to various combinations of a compound (A) and an inorganic salt (B) are obtained.

The invention claimed is:

1. A latent heat storage material comprising:
a compound (A) represented by the following formula (A);
an inorganic salt (B) represented by the following formula (B) and composed of a cation of an alkali metal and an anion of a same element as an anion of the compound (A); and
water, wherein
the compound (A) is a material that forms a clathrate hydrate together with the water,
a composition ratio of the compound (A) and water is a composition ratio that gives a congruent melting point of the clathrate hydrate,
a molar ratio of the inorganic salt (B) to the compound (A) is 0.1 or more and 10 or less, $AR_4^+X^-$                                                            formula (A), $M^+X^-$                                                             formula (B), in the formula (A), A is N or P, R is a C1-10 alkyl group, and $X^-$ is $F^-$, $Cl^-$, $Br^-$, $I^-$, $NO_3^-$, $CH_3COO^-$, $CH_3CH_2COO^-$, $CH_3CH_2CH_2CO^-$, or $CH_2{=}CHCOO^-$, and
in the formula (B), $M^+$ is $K^+$, $Rb^+$, or $Cs^+$, and $X^-$ is $F^-$, $Cl^-$, $Br^-$, $I^-$, $NO_3^-$, $CH_3COO^-$, $CH_3CH_2COO^-$, $CH_3CH_2CH_2COO^-$, or $CH_2{=}CHCOO^-$.

2. The latent heat storage material according to claim 1, wherein the compound (A) is a quaternary ammonium salt.

3. The latent heat storage material according to claim 1, wherein the compound (A) is tetrabutylammonium bromide.

4. The latent heat storage material according to claim 3, wherein a molar ratio of water to the tetrabutylammonium bromide is 22 or more and 32 or less.

5. The latent heat storage material according to claim 1, wherein the alkali metal is potassium.

6. The latent heat storage material according to claim 5, wherein the inorganic salt (B) is potassium bromide.

7. The latent heat storage material according to claim 1, wherein the compound (A) is tetrabutylammonium bromide, and the inorganic salt (B) is potassium bromide.

8. The latent heat storage material according to claim 7, wherein a molar ratio of the potassium bromide to the tetrabutylammonium bromide is 0.5 or more.

9. The latent heat storage material according to claim 7, wherein a molar ratio of the potassium bromide to the tetrabutylammonium bromide is 0.75 or more.

10. The latent heat storage material according to claim 7, wherein a molar ratio of the potassium bromide to the tetrabutylammonium bromide is less than 1.5.

11. The latent heat storage material according to claim 4, wherein the compound (A) is tetrabutylammonium bromide, and the inorganic salt (B) is cesium bromide.

12. The latent heat storage material according to claim 1, wherein the compound (A) is tetrabutylammonium chloride, and the inorganic salt (B) is potassium chloride.

13. A cold storage tool for cooling an object to be kept cold, the cold storage tool comprising:
the latent heat storage material according to claim 1 and an accommodation portion for accommodating the latent heat storage material in a liquid-tight state.

14. The cold storage tool according to claim 13, further comprising:
a plurality of accommodation portions including the accommodation portion; and
a joint for connecting the plurality of accommodation portions.

15. A logistic packaging container comprising the cold storage tool according to claim 13.

16. A human body refrigeration tool comprising the cold storage tool according to claim 13.

17. A beverage cold storage tool comprising the cold storage tool according to claim 13.

18. A cooling method comprising:
surrounding an object to be kept cold with the cold storage tool according to claim 13 along a circumferential direction of a first axis that passes through the object to be kept cold.

19. The cooling method according to claim 18, wherein the object to be kept cold is further surrounded by the cold storage tool along a circumferential direction of a second axis that passes through the object to be kept cold and intersects the first axis.

20. A latent heat storage material comprising:
a compound (A) represented by the following formula (A),
an inorganic salt (B) represented by the following formula (B) and composed of a cation of an alkali metal and an anion of a same element as an anion of the compound (A); and
water, wherein
the compound (A) is a material that forms a clathrate hydrate together with the water,
a composition ratio of the compound (A) and water is a composition ratio that gives a congruent melting point of the clathrate hydrate, a molar ratio of the inorganic salt (B) to the compound (A) is 0.1 or more and 10 or less, $$AR_4^+X^- \quad \text{formula (A)},$$

$$M^+X^- \quad \text{formula (B)},$$

in the formula (A), A is N or P, R is a C1-10 alkyl group, and $X^-$ is $F^-$, $Cl^-$, $Br^-$, $I^-$, $NO_3^-$, $CH_3COO^-$, $CH_3CH_2COO^-$, $CH_3CH_2CH_2COO^-$, $CH_2\!=\!CHCOO^-$, or $PO_4^{3-}$, in the formula (B), $M^+$ is $K^+$, $Rb^+$, or $Cs^+$, and $X^-$ is $F^-$, $Cl^-$, $Br^-$, $I^-$, $NO_3^-$, $CH_3COO^-$ $CH_3CH_2COO^-$, $CH_3CH_2CH_2COO^-$, $CH_2\!=\!CHCOO^-$, or $PO_4^{3-}$, and the compound (A) is tetrabutylammonium bromide.

\* \* \* \* \*